(12) United States Patent
Maniktala et al.

(10) Patent No.: US 10,840,745 B1
(45) Date of Patent: Nov. 17, 2020

(54) SYSTEM AND METHOD FOR FREQUENCY CONTROL AND FOREIGN OBJECT DETECTION IN WIRELESS POWER TRANSFER

(71) Applicant: ChargEdge, Inc., Fremont, CA (US)

(72) Inventors: Sanjaya Maniktala, Fremont, CA (US); Disha Maniktala, Fremont, CA (US)

(73) Assignee: CHARGEDGE, INC., Fremont, CA (US)

( * ) Notice: Subject to any disclaimer, the term of this patent is extended or adjusted under 35 U.S.C. 154(b) by 0 days.

(21) Appl. No.: 15/882,147

(22) Filed: Jan. 29, 2018

Related U.S. Application Data

(60) Provisional application No. 62/452,308, filed on Jan. 30, 2017.

(51) Int. Cl.
*H02J 50/60* (2016.01)
*H02J 50/12* (2016.01)
*H02J 7/00* (2006.01)

(52) U.S. Cl.
CPC ............ *H02J 50/60* (2016.02); *H02J 7/0077* (2013.01); *H02J 50/12* (2016.02)

(58) Field of Classification Search
CPC ........... H02J 50/12; H02J 50/60; H02J 7/0077
USPC ......................................................... 307/104
See application file for complete search history.

(56) References Cited

U.S. PATENT DOCUMENTS 6,212,430 B1  4/2001 Kung
7,948,781 B2  5/2011 Esaka
9,276,437 B2  3/2016 Partovi et al.
9,548,621 B2  1/2017 Asanuma et al.
2005/0073466 A1  4/2005 Karlsen
2006/0061324 A1  3/2006 Oglesbee
(Continued)

FOREIGN PATENT DOCUMENTS

WO   WO2013122483 A1   8/2013
WO   WO2013154440 A1   10/2013

OTHER PUBLICATIONS

Wireless Power Consortium, "Qi System Description Wireless Power Transfer," vol. I: Low Power, Part 1: Interface Definition, Version 1.1.2, Jun. 2013.
(Continued)

*Primary Examiner* — Hal Kaplan
(74) *Attorney, Agent, or Firm* — White & Cases LLP

(57) ABSTRACT

In one embodiment, a method for frequency control in a wireless power transmitter comprises detecting a resonant frequency of the wireless power transmitter, determining an optimized frequency that is at least approximately 1% greater than the detected resonant frequency, and operating the wireless power transmitter at the optimized frequency. In one embodiment, the optimized frequency is approximately 1% to 15% greater than the detected resonant frequency. In one embodiment, the optimized frequency is approximately 5% greater than the detected resonant frequency. In one embodiment, the method further comprises detecting an amount of change in the resonant frequency of the wireless power transmitter, adjusting the optimized operating frequency by the amount of change in the resonant frequency, and operating the wireless power transmitter at the adjusted optimized operating frequency.

18 Claims, 14 Drawing Sheets

(56) References Cited

U.S. PATENT DOCUMENTS

| | | | |
|---|---|---|---|
| 2009/0096413 A1 | 4/2009 | Partovi et al. | |
| 2010/0181841 A1 | 7/2010 | Azancot et al. | |
| 2010/0259217 A1 | 10/2010 | Baarman et al. | |
| 2011/0115429 A1 | 5/2011 | Toivola et al. | |
| 2011/0217927 A1 | 9/2011 | Ben-Shalom et al. | |
| 2011/0304216 A1 | 12/2011 | Baarman | |
| 2012/0025611 A1* | 2/2012 | Kamata | H02J 5/005 307/43 |
| 2012/0154086 A1 | 6/2012 | Willemsen et al. | |
| 2012/0280575 A1* | 11/2012 | Kim | H02J 17/00 307/104 |
| 2013/0043734 A1 | 2/2013 | Stone et al. | |
| 2013/0049484 A1* | 2/2013 | Weissentern | H02J 5/005 307/104 |
| 2013/0093252 A1 | 4/2013 | Norconk et al. | |
| 2013/0175877 A1 | 7/2013 | Abe et al. | |
| 2013/0214591 A1 | 8/2013 | Miller et al. | |
| 2013/0249479 A1 | 9/2013 | Partovi | |
| 2013/0307468 A1 | 11/2013 | Lee et al. | |
| 2014/0070622 A1 | 3/2014 | Keeling et al. | |
| 2014/0167688 A1 | 6/2014 | Doyle et al. | |
| 2014/0232330 A1 | 8/2014 | Robertson et al. | |
| 2014/0266031 A1 | 9/2014 | Sasaki | |
| 2015/0091388 A1 | 4/2015 | Golko et al. | |
| 2015/0295416 A1 | 10/2015 | Li | |
| 2015/0372493 A1 | 12/2015 | Sankar | |
| 2016/0111887 A1 | 4/2016 | Jeong | |

OTHER PUBLICATIONS

Maniktala, S., "Fixing EMI across the Board," EE Times, Nov. 5, 2003, http://www.eetimes.com/document.asp?doc_id=1230444.

Maniktala, S., "More on Designing Reliable Electronic Ballasts," EE Times, Apr. 20, 2005, http://www.eetimes.com/document.asp?doc_id=1272231.

Maniktala, S. "The Confluence of Resonant Switching Topologies and Wireless Charging," presented at ISSCC 2015, San Francisco, CA, Feb. 26, 2015.

Maniktala, S., "WPT Breaks All Connections, Part 1," EDN Network, Mar. 9, 2015, http://www.edn.com/design/power-management/4438850/WPT-breaks-all-connections-Part-1.

Maniktala, S., "WPT Breaks All Connections, Part 2," EDN Network, Mar. 14, 2015, http://www.edn.com/design/power-management/4438924/WPT-breaks-all-connections--Part-2.

Maniktala, S., "WPT Breaks All Connections, Part 3," EDN Network, Apr. 6, 2015, http://www.edn.com/design/power-management/4439125/WPT-breaks-all-connections-Part-3.

Power Matters Alliance, "PMA Inductive Wireless Power and Charging Transmitter Specification—System Release 1," PMA-TS-0003-0 v2.00, Apr. 24, 2014.

Power Matters Alliance, "PMA Inductive Wireless Power and Charging Receiver Specification—System Release 1," PMA-TS-0001-0 v1.00, Nov. 16, 2013.

"Notification of Transmittal of the International Search Report and The Written Opinion of the International Searching Authority," Int'l Appl. No. PCT/US2016/066105, dated Feb. 17, 2017.

"Notification of Transmittal of the International Search Report and The Written Opinion of the International Searching Authority," Int'l Appl. No. PCT/US2017/020465, dated May 11, 2017.

"Notification of Transmittal of the International Search Report and The Written Opinion of the International Searching Authority," Int'l Appl. No. PCT/US2016/024483, dated Jun. 20, 2016.

"Notification of Transmittal of the International Search Report and The Written Opinion of the International Searching Authority," Int'l Appl. No. PCT/US17/49756, dated Nov. 9, 2017.

* cited by examiner

SYSTEM AND METHOD FOR FREQUENCY CONTROL AND FOREIGN OBJECT DETECTION IN WIRELESS POWER TRANSFER

CROSS-REFERENCE TO RELATED APPLICATION

This application claims the benefit of U.S. Provisional Patent Application No. 62/452,308, entitled "Control Algorithms for Efficient and High Wireless Power Transfer, and for Detecting Foreign Metallic Objects," filed on Jan. 30, 2017, the subject matter of which is hereby incorporated by reference in its entirety.

FIELD OF THE INVENTION

The invention relates generally to wireless power transfer and more particularly to a system and method for frequency control and foreign object detection in wireless power transfer.

BACKGROUND

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone or other portable device.

The Wireless Power Consortium (WPC) was established in 2008 to develop the Qi inductive power standard for charging and powering electronic devices. Powermat is another well-known standard for WPT developed by the Power Matters Alliance (PMA). There also have been some market consolidation efforts to unite into larger organizations, such as the AirFuel Alliance consisting of PMA and the Rezence standard from the Alliance For Wireless Power (A4WP).

In early versions of both the Qi and Powermat standards the peak resonant frequency of the wireless power transfer process was assumed to be fixed at a certain frequency, 100 kHz for Qi and 277 kHz for Powermat. These fixed values were based on the nominal values of the primary inductance of the transmitter coil and the primary capacitance of the associated transmitter-side resonant capacitor in series with the transmitter coil. The operating frequency for transmitters called for in these standards was based on these assumed fixed resonant frequencies. In actual wireless power transmitters the peak resonant frequency is not fixed but is rather a function of the nominal inductance and capacitance values of the transmitter coil and capacitor and other factors such as component variations, load, and leakage. Different wireless power receivers may put different loads on a particular wireless power transmitter, and power leakage can vary depending on how well-aligned a wireless power receiver's coil is to the transmitter coil. Variations in the actual resonant frequency of a wireless power transmitter can affect the entire behavior of the wireless power transfer system.

Later versions of these standards allowed for slight variations in the operating frequency away from the assumed fixed resonant frequency, but these variations still relied on the basic assumption that the resonant frequency of the transmitter was a known fixed value based on the nominal inductance of the transmitter coil (measured without being magnetically coupled to a receiver coil) and the nominal capacitance of the resonant capacitor. The Qi standard still demands that the receiver be tuned to a fixed frequency, the same as the assumed fixed resonant frequency of the transmitter, i.e., 100 KHz, which is similarly based on the receiver coil inductance measured without being in proximity to a transmitter coil and the receiver resonant capacitor. In actual operating Qi systems, the resonant frequencies generated while the transmitter and receiver are magnetically coupled are variable, which is not just unpredictable but adversely affects the ability to deliver more power. As maximum power transfer in a wireless power system occurs when the operating frequency is close to or at the resonant frequency, an incorrect assumption about the resonant frequency affects the ability of the system to deliver close to maximum power. The incorrect assumption about the resonant frequency also creates anomalies in the control loop, which in Qi and PowerMat typically demands that to increase power, the frequency should be lowered close to the assumed fixed resonant frequency. As the actual (and varying) resonant frequency was often higher than the assumed resonant frequency, the delivered power would decrease instead and the transmitter would turn off due to this anomaly, sometimes referred to as "control inversion." For example, if the actual resonant frequency of a wireless power transfer system is 150 kHz but the assumed resonant frequency is 100 kHz, the system may adjust the operating frequency closer to 100 kHz in an attempt to increase the delivered power but may actually be lowering the delivered power by moving too far away from the actual resonant frequency. An operating frequency that is too far from the actual resonant frequency can also cause large unanticipated voltage peaks in the resonant components in both the receiver and the transmitter. The reliability of the wireless power transfer system thus can also be affected by assuming an incorrect fixed resonant frequency.

Another drawback of assuming a fixed resonant frequency for a wireless power system is that the operating frequency may be set at a frequency lower than the actual resonant frequency, which causes the overall behavior of the wireless power transmitter coil and capacitor (the "LC tank") to be capacitive. When the overall behavior of the LC tank is capacitive, switching losses occur in the transistor bridge circuit that generates a time-varying current applied to the transmitter coil, lowering efficiency. An operating frequency that is higher than the actual resonant frequency allows for zero-voltage switching by the transmitter. Zero-voltage switching ensures that the current in any transistor of the bridge switching circuit is momentarily negative (i.e., flowing through its body diode) at the moment that the transistor is switched on. Zero-voltage switching in the transmitter provides minimal switching losses and higher efficiency. If the assumed resonant frequency, which is the incorrect target frequency for maximum power transfer, is significantly less than the actual resonant frequency, there is a higher likelihood that the operating frequency used by the wireless power transmitter will be lower than the actual resonant frequency, preventing zero-voltage switching and lowering efficiency.

Wireless power transfer transmitters commonly have a flat surface on which devices to be charged are placed. Objects other than devices that can be wirelessly charged are sometimes placed on the charging surface of a wireless power transmitter, whether intentionally or inadvertently. Certain metal objects such as coins, keys, paper clips, and some jewelry can develop eddy currents in response to the varying magnetic field produced by the wireless power transmitter. Such "foreign objects" cause losses in the power being transferred to a wirelessly-chargeable device. Also, if left on the surface of the transmitter for a period of time, the eddy currents can cause the foreign metal object to overheat, potentially causing burns or igniting a fire. Detecting foreign objects on the transmitting surface of a wireless power transmitter is desirable to avoid power losses and potentially dangerous conditions.

Thus there is a need for a system and method for frequency control and foreign object detection in wireless power transfer systems.

SUMMARY

In one embodiment, a method for frequency control in a wireless power transmitter comprises detecting a resonant frequency of the wireless power transmitter, determining an optimized frequency that is at least approximately 1% greater than the detected resonant frequency, and operating the wireless power transmitter at the optimized frequency. In one embodiment, the optimized frequency is approximately 1% to 15% greater than the detected resonant frequency. In one embodiment, the optimized frequency is approximately 5% greater than the detected resonant frequency. In one embodiment, the method further comprises detecting an amount of change in the resonant frequency of the wireless power transmitter, adjusting the optimized operating frequency by the amount of change in the resonant frequency, and operating the wireless power transmitter at the adjusted optimized operating frequency. In one embodiment, detecting an amount of change in the resonant frequency of the wireless power transmitter is based on a detected voltage signal. In one embodiment, detecting an amount of change in the resonant frequency of the wireless power transmitter is based on a detected current signal. In one embodiment, detecting a resonant frequency of the wireless power transmitter comprises operating the wireless transmitter at each of a series of frequencies, detecting a peak voltage magnitude value of a voltage at a node between a transmitter coil and a resonant capacitor at each of the series of frequencies, identifying which one of the series of frequencies corresponds to a maximum peak voltage magnitude value, and recording the one of the series of frequencies that corresponds to the maximum peak voltage magnitude value as the resonant frequency.

In one embodiment, a system for frequency control in a wireless power transmitter comprises a transmitter coil coupled in series with a capacitor, a voltage detector configured to detect a voltage at a node between the transmitter coil and the capacitor, the voltage detector further configured to generate a peak voltage value signal, and a controller configured to detect a resonant frequency of the wireless power transmitter based on the peak voltage value signal, the controller further configured to calculate an optimized operating frequency for the wireless power transmitter that is at least 1% greater than the resonant frequency and to operate the wireless power transmitter at the optimized operating frequency. In one embodiment, the optimized operating frequency is approximately 1% to 15% greater than the detected resonant frequency. In one embodiment, the optimized operating frequency is approximately 5% greater than the detected resonant frequency. In one embodiment, the controller is further configured to detect an amount of change of the detected resonant frequency, adjust the optimized operating frequency by the amount of change in the resonant frequency, and operate the wireless power transmitter at the adjusted optimized operating frequency. In one embodiment, the voltage detector is further configured to generate a voltage magnitude signal and the controller is configured to detect the amount of change of the detected resonant frequency based on the voltage magnitude signal. In one embodiment, the system further comprises a current detector configured to generate a current magnitude signal, and the controller is configured to detect the amount of change of the detected resonant frequency based on the current magnitude signal. In one embodiment, the controller is configured to detect the resonant frequency by operating the wireless transmitter at each of a series of frequencies, identifying which one of the series of frequencies corresponds to a maximum peak voltage magnitude value of the peak voltage magnitude signal, and recording the one of the series of frequencies that corresponds to the maximum peak voltage magnitude value as the resonant frequency.

In one embodiment, the controller is further configured to detect foreign metallic objects on a transmitting surface of the wireless power transmitter by comparing the peak voltage magnitude value at at least one of the series of frequencies to a predetermined threshold; and if the peak voltage magnitude value at the at least one of the series of frequencies is below the predetermined threshold, ceasing providing power to the transmitter coil and resonant capacitor.

In one embodiment, a method for frequency control of a wireless power transmitter comprises operating the wireless power transmitter at a plurality of frequencies, identifying one of the plurality of frequencies as a resonant frequency of the wireless power transmitter, determining an optimized operating frequency for the wireless power transmitter by calculating a frequency value that is approximately 1% to 15% greater than the resonant frequency, and operating the wireless power transmitter at the optimized operating frequency. In one embodiment, identifying one of the plurality of frequencies as the resonant frequency comprises identifying which one of the plurality of frequencies produces a maximum of a peak voltage signal at a node between a transmitter coil and a resonant capacitor of the wireless power transmitter. In one embodiment, the method further comprises monitoring a voltage magnitude signal to identify if the resonant frequency has changed, and if the resonant frequency has changed, adjusting the optimized operating frequency by an amount approximately equal to an amount of change of the resonant frequency. In one embodiment, the method further comprises monitoring a current magnitude signal to identify if the resonant frequency has changed, and if the resonant frequency has changed, adjusting the optimized operating frequency by an amount approximately equal to an amount of change of the resonant frequency.

DETAILED DESCRIPTION

Figure 1A:
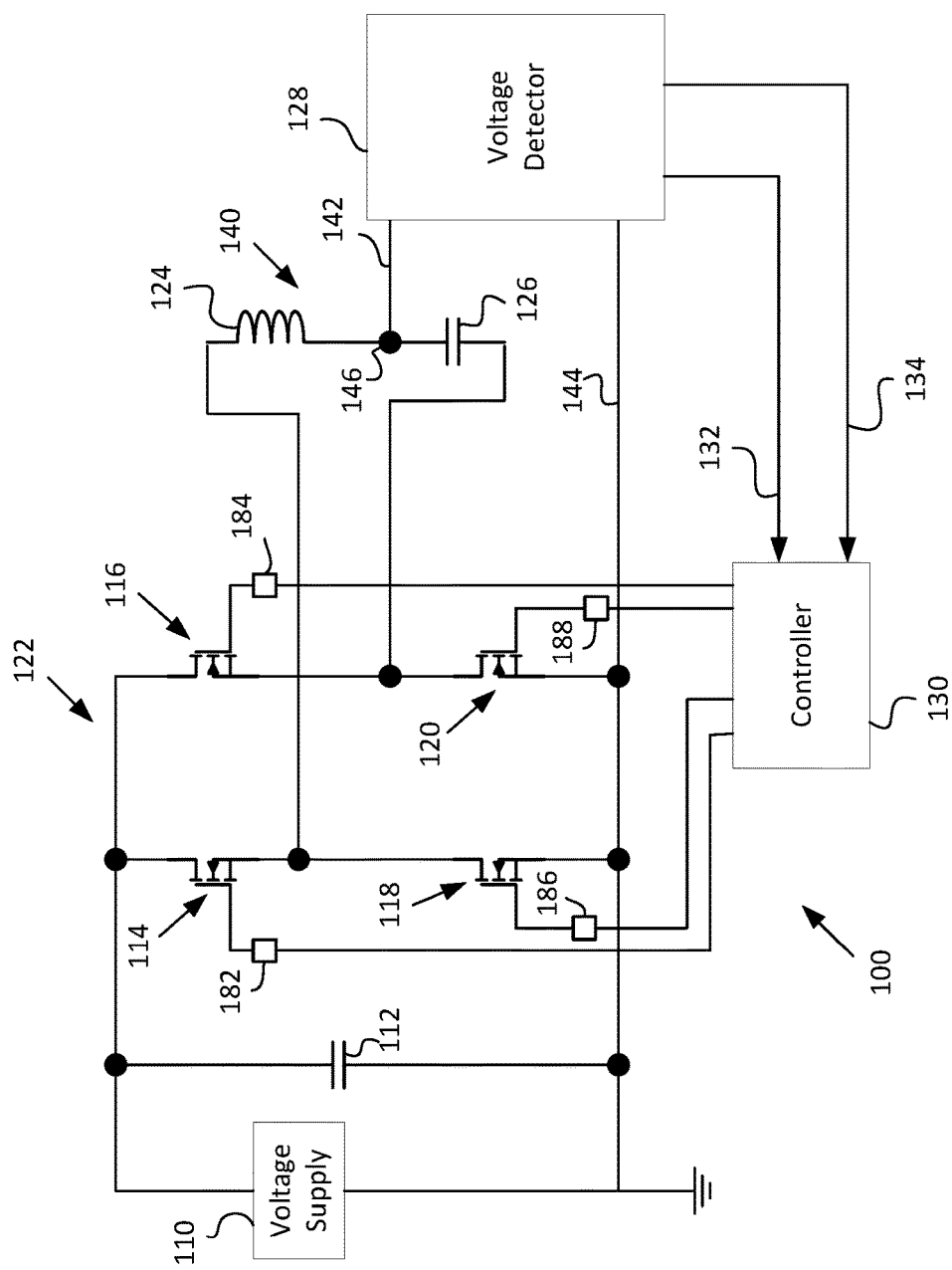
FIG. 1A is a diagram of one embodiment of a wireless power transmitter including a voltage detector, according to the invention.

FIG. 1A is a diagram of one embodiment of a wireless power transmitter 100, according to the invention. Transmitter 100 includes, but is not limited to, a direct current (DC) voltage supply 110, a capacitor 112, a full-bridge circuit 122 including a transistor 114, a transistor 116, a transistor 118, and a transistor 120, a transmitter coil 124, a capacitor 126, a voltage detector 128, and a controller 130. Voltage supply 110 provides a DC input voltage for transmitter 100, and in one embodiment the input voltage is a constant value of approximately 12-15 V. In another embodiment, voltage supply 110 is implemented as a DC-to-DC converter that provides a variable DC input voltage to full-bridge 122 and controller 130 provides a control signal to voltage supply 110 to select the input voltage value. In other embodiments, the input voltage value to transmitter coil 124 and capacitor 126 may be varied by duty cycle control or phase modulation of full-bridge circuit 122 by controller 130. In other embodiments, a combination of a variable input voltage from voltage supply 110, duty cycle variation, and/or phase modulation may be used to vary the voltage input to transmitter coil 124 and capacitor 126.

Controller 130 provides control signals to full-bridge circuit 122 via driver circuits 182, 184, 186, and 188 to drive each of transistors 114, 116, 118, and 120 on or off. In the FIG. 1A embodiment, each of transistors 114, 116, 118, and 120 is an n-type MOSFET; however any other type of transistor is within the scope of the invention. Controller 130 controls the timing of switching transistors 114, 116, 118, and 120 on and off to provide an alternating current to transmitter coil 124 and capacitor 126. In one embodiment, controller 130 will turn on (e.g., apply a "high" signal to the gates of) transistor 114 and transistor 120 while turning off (e.g., applying a "low" signal to the gates of) transistor 116 and transistor 118 during a time interval. During a next time interval, controller 130 will turn on transistor 116 and transistor 118 and turn off transistor 114 and transistor 120. Controller 130 may also provide for "dead time" between the time intervals, during which potentially cross-conducting pairs of transistors in full-bridge circuit 122, for example transistors 114 and 118 and/or transistors 116 and 120, are simultaneously off. In one embodiment, the dead time has a duration in the range of 100 nanoseconds to 1 millisecond. The timing of switching these pairs of transistors in full-bridge circuit 122 on and off by controller 130 establishes an operating frequency for transmitter 100. In another embodiment, controller 130 provides control signals to full-bridge circuit 122 such that it operates as a half-bridge. In this embodiment, controller 130 maintains transistor 116 in an off state and transistor 120 in an on state, and alternately switches on transistor 114 and transistor 118. In this embodiment, full-bridge circuit 122 provides approximately half of the input voltage from voltage supply 110 to transmitter coil 124 and capacitor 126.

Transmitter coil 124 and capacitor 126 together form an LC tank 140. In other embodiments, LC tank 140 includes a plurality of transmitter coils and a plurality of capacitors. Voltage detector 128 receives as an input a voltage measured between a path 142 coupled to a node 146 between transmitter coil 124 and capacitor 126 and a path 144 to ground. In embodiments with more than one transmitter coil and more than one capacitor, the input to voltage detector 128 is coupled to a node between one of the transmitter coils and one of the capacitors. Voltage detector 128 detects and rectifies the voltage at node 146 and provides a peak voltage value signal to controller 130 through a path 132. The peak voltage value signal tracks the peak amplitude values of the rectified voltage waveform measured at node 146. Voltage detector 128 tracks the peak values of the rectified voltage when transmitter 100 is not under load and also when transmitter 100 is under load from a wireless receiver (not shown). Voltage detector 128 also provides a rectified voltage signal to controller 130 through a path 134. An embodiment of voltage detector 128 is discussed further below in conjunction with FIG. 1B.

In one embodiment, controller 130 is a microcontroller executing firmware configured to process the peak voltage value signal and the rectified voltage signal from voltage detector 128 and to generate the control signals for full-bridge circuit 122. In other embodiments, controller 130 is embodied as a field programmable gate array, a state machine, or an application specific integrated circuit (ASIC) configured to process the signals from voltage detector 128 and to generate the control signals. Controller 130 is configured to vary the operating frequency of transmitter 100 over a range of frequencies and to process the resulting peak voltage value signal from voltage detector 128 to detect the resonant frequency of transmitter 100. Controller 130 is further configured to calculate an optimized operating frequency for transmitter 100 based on the detected resonant frequency. The optimized operating frequency for transmitter 100 is approximately 1-15% greater than the actual detected resonant frequency of transmitter 100. In one embodiment, the optimized operating frequency is approximately 5% greater than the detected resonant frequency of transmitter 100. An operating frequency that is approximately 1% to 15% greater than the actual resonant frequency has the effect that LC tank 140 appears inductive to full-bridge circuit 122 such that residual current will tend to flow naturally to either of the input supply rails during the dead time, allowing for zero-voltage switching and higher efficiency. By operating transmitter 100 at a frequency that is 1-15% greater than the detected resonant frequency, transmitter 100 provides close to its maximum available power to a wireless power receiver while also enabling zero-voltage switching of full-bridge circuit 122.

After controller 130 determines the optimized operating frequency by first locating the actual resonant frequency based on the peak amplitude of the voltage waveform at node 146, controller 130 then monitors the shape of the voltage waveform at node 146 by processing the rectified voltage signal from voltage detector 128 to identify any changes to the resonant frequency and adjusts the operating frequency as needed to maintain the operating frequency at a value that is approximately 1-15% greater than the present resonant frequency. In one embodiment, controller 130 monitors the time difference between the zero-crossing of the voltage signal from voltage detector 128 and the center of a timing pulse of at least one of the control signals to full-bridge circuit 122, and adjusts the timing of the control signals (and thus also the operating frequency) if necessary to maintain the desired time difference.

In another embodiment, controller 130 is configured to establish the optimized operating frequency as a minimum operating frequency and may adjust the operating frequency, for example in response to requests from a wireless power receiver, without going below the minimum operating frequency. By not allowing the operating frequency to go below the optimized operating frequency, controller 130 ensures that LC tank 140 behaves in an overall inductive manner.

In one embodiment, controller 130 is further configured to detect foreign objects on a transmitting surface (not shown) of transmitter 100. When a metallic foreign object such as a coin or a key is present on the transmitting surface, eddy current losses in the foreign object will reduce the magnitude of the voltage detected by voltage detector 128. A metal object absorbs power at almost any frequency, at an approximately constant fraction of the transmitter power at any input voltage. In contrast, a wireless power receiver typically activates and draws significant power from a transmitter only when the rectified received voltage exceeds a certain threshold, known as an under voltage lockout (UVLO) threshold. In this embodiment, controller 130 detects the presence of metallic foreign objects by comparing the peak voltage value signal at a frequency close to (for example, approximately 0.1 kHz greater than) the detected resonant frequency to a predetermined threshold. If the peak voltage value is less than the predetermined threshold, controller 130 reports a fault and turns off all of the transistors in full-bridge circuit 122 to cease providing power to transmitter coil 124. In one embodiment, controller 130 is configured to send a control signal to voltage supply 110 to generate an input voltage that is less than the under voltage lockout (UVLO) threshold of a wireless power receiver. Controller 130 then compares the peak voltage value signal to a predetermined threshold that is less than or substantially equal to an expected peak voltage value associated with the input voltage. By applying an input voltage from voltage supply 110 that is less than the UVLO threshold of a wireless power receiver, controller 130 is able to detect the presence of a foreign object on the transmitting surface before a wireless power receiver on the transmitting surface will detect a power signal from transmitter 100.

In one embodiment, controller 130 performs foreign object detection in conjunction with detecting the resonant frequency of transmitter 100. Such an embodiment is discussed below in conjunction with FIGS. 7A and 7B. In another embodiment, controller 130 performs foreign object detection separately from detecting the resonant frequency of transmitter 100. Such an embodiment is discussed below in conjunction with FIG. 8.

Figure 1B:
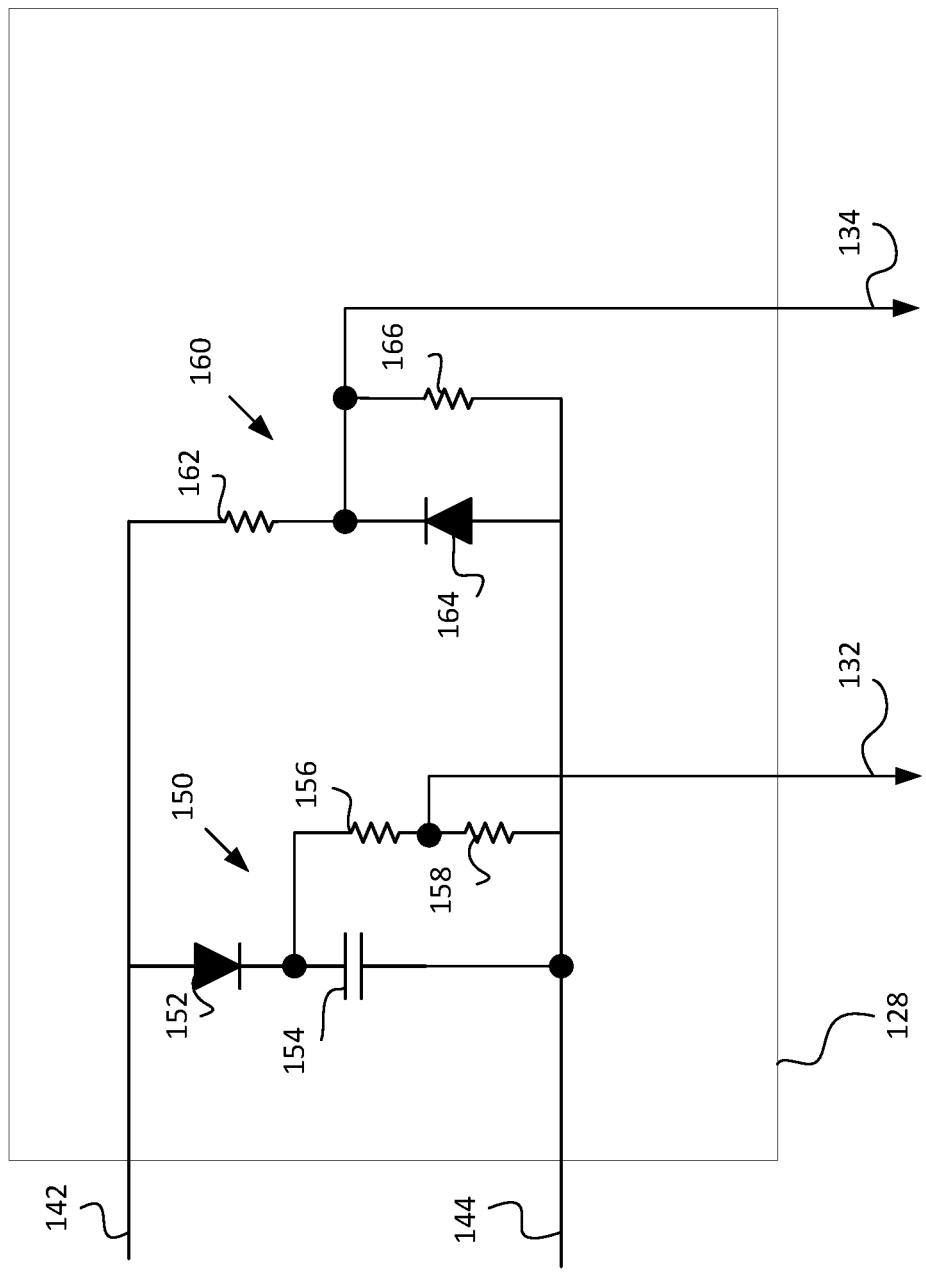
FIG. 1B is a diagram of one embodiment of the voltage detector of FIG. 1A, according to the invention.

FIG. 1B is a diagram of one embodiment of voltage detector 128 of FIG. 1A, according to the invention. Voltage detector 128 includes but is not limited to a peak voltage detector circuit 150 and a voltage magnitude detector circuit 160. Peak voltage detector circuit 150 includes a diode 152 coupled in series with a capacitor 154, a resistor 156, and a resistor 158. In one embodiment, capacitor 154 has a capacitance value of approximately 1 nF, resistor 156 has a resistance value of approximately 200 kΩ, and resistor 158 has a resistance value of approximately 10 kΩ. Path 132 is coupled to a location between resistor 156 and resistor 158 to provide the peak voltage value signal to controller 130. The resistor divider of resistor 156 and resistor 158 scales down the detected voltage to levels appropriate to be input to controller 130. Voltage magnitude circuit 160 includes a resistor 162, a diode 164, and a resistor 166. In one embodiment, resistor 162 has a resistance value of approximately 200 kΩ and resistor 166 has a resistance value of approximately 10 kΩ. Path 134 is coupled to voltage magnitude circuit 160 to provide the voltage magnitude signal to controller 130. The resistor divider of resistor 162 and resistor 166 scales down the detected voltage to levels appropriate to be input to controller 130.

Figure 2B:
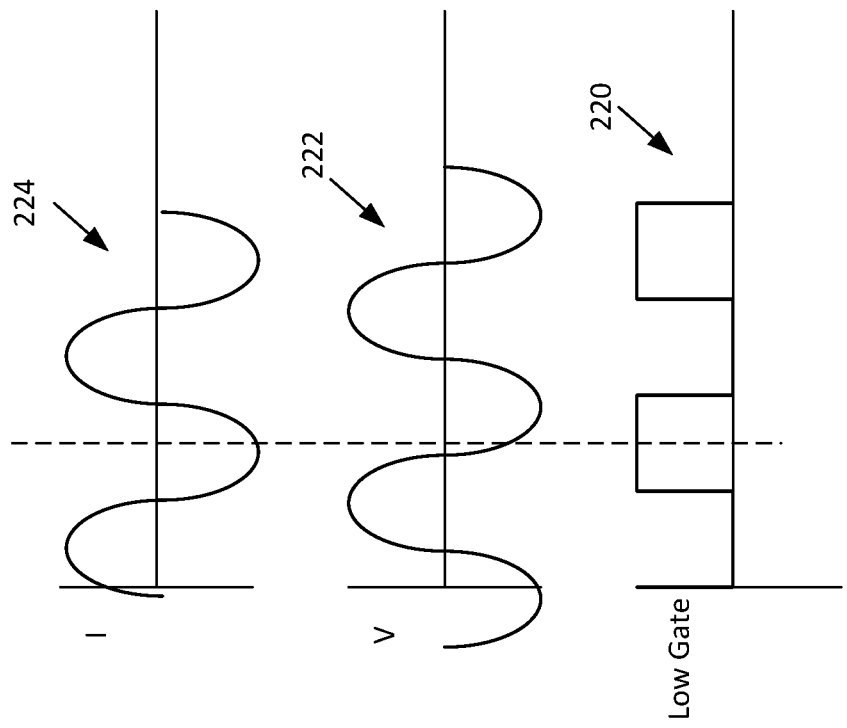
FIGS. 2A-2D are diagrams illustrating relationships between an operating frequency and a resulting current and voltage in a wireless power transmitter, according to embodiments of the invention.
Figure 2A:
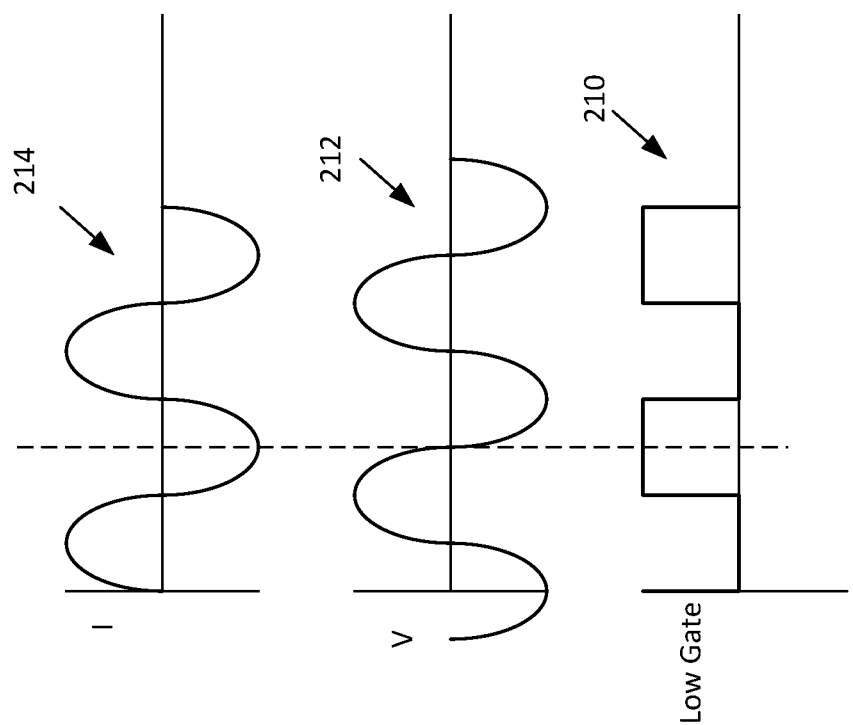

FIGS. 2A-2D are diagrams illustrating relationships between an operating frequency and a resulting current and voltage in a wireless power transmitter, according to embodiments of the invention. FIG. 2A shows waveforms for a current 214 and a voltage 212 of transmitter 100. A low gate waveform 210 represents the control signal provided to transistor 118 of transmitter 100 by controller 130 (dead time between pulses is not shown for clarity of illustration). The frequency of the low gate waveform 210 is also the operating frequency of transmitter 100. Current 214 represents the coupled current flowing through LC tank 140, which is the component of the current that is passed or transmitted from transmitter 100 (primary) to a wireless receiver (secondary) with primary-to-secondary turns ratio scaling in accordance with well-known principles of transformer action based on Faraday's law of induction. Voltage 212 waveform represents the coupled voltage detected at node 146 between transmitter coil 124 and capacitor 126, which is the component of the voltage that is passed or transmitted from transmitter 100 to a wireless receiver. FIG. 2A shows an embodiment in which the frequency of the control signal provided to transistor 118 (i.e., the operating frequency of transmitter 100) is equal to the resonant frequency of transmitter 100. At the center of each pulse of low gate waveform 210, voltage 212 crosses zero and current 214 is at its positive or negative peak value. Transmitter 100 provides its maximum power when the operating frequency equals the resonant frequency.

FIG. 2B shows an embodiment in which the operating frequency of transmitter 100 is less than the resonant frequency of transmitter 100. The zero crossing of a voltage 222 and the peak of a current 224 leads the center of each pulse of a low gate waveform 220 (i.e., the control signal applied to transistor 118). When the operating frequency of transmitter 100 is less than the resonant frequency, the capacitive reactance of LC tank 140 is greater than the inductive reactance of LC tank 140, so the behavior of LC tank 140 is capacitive. Capacitive behavior of LC tank 140 is not desirable for efficiency. FIG. 2C shows an embodiment in which the operating frequency of transmitter 100 is greater than the resonant frequency of transmitter 100. The zero crossing of a voltage 232 and the peak of a current 234 lags the center of each pulse of a low gate waveform 230 (i.e., the control signal applied to transistor 118). When the operating frequency of transmitter 100 is greater than the resonant frequency, the inductive reactance of LC tank 140 is greater than the capacitive reactance of LC tank 140, so the behavior of LC tank 140 is inductive. Inductive behavior of LC tank 140 is desirable for efficiency because it allows for zero-voltage switching of the transistors in full-bridge circuit 122.

Figure 2D:
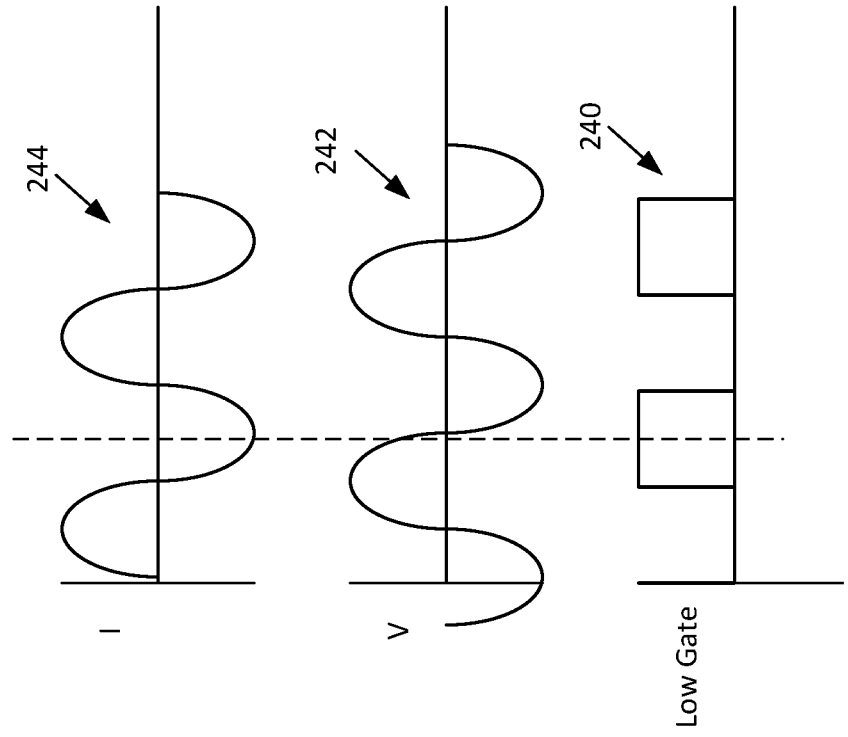
Figure 2C:
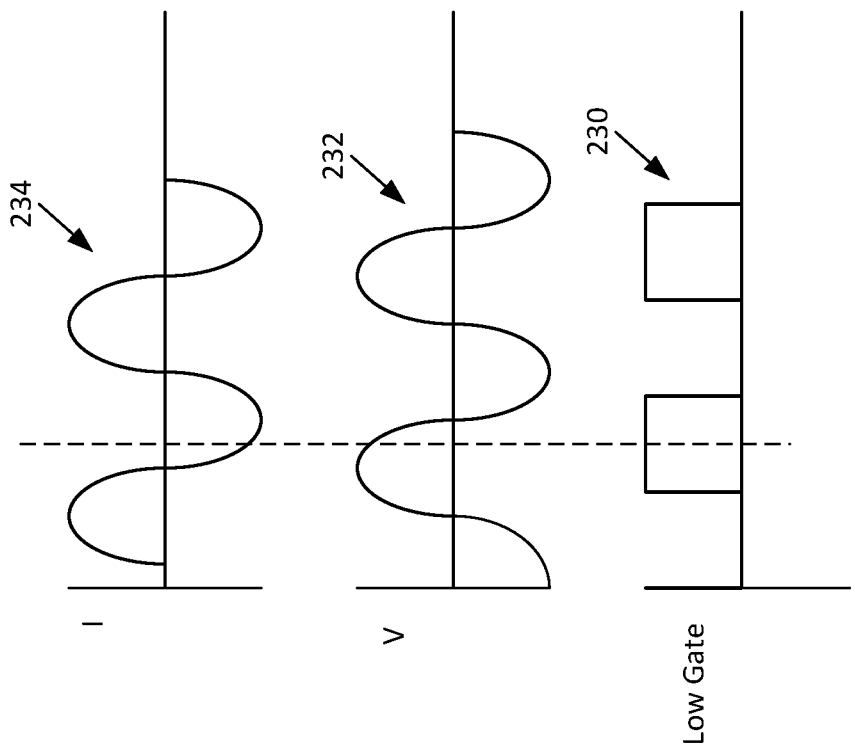

FIG. 2D shows an embodiment in which the operating frequency of transmitter 100 is greater than the resonant frequency of transmitter 100 by a small percentage, for example 5%. The zero crossing of a voltage 242 and the peak of a current 244 lags a corresponding time behind the center of each pulse of a low gate waveform 240 (i.e., the control signal applied to transistor 118). When the operating frequency of transmitter 100 is about 1-15% greater than the actual detected resonant frequency, transmitter 100 provides close to its maximum power while the behavior of LC tank 140 is inductive, which allows for zero-voltage switching of the transistors in full-bridge 122.

Figure 3A:
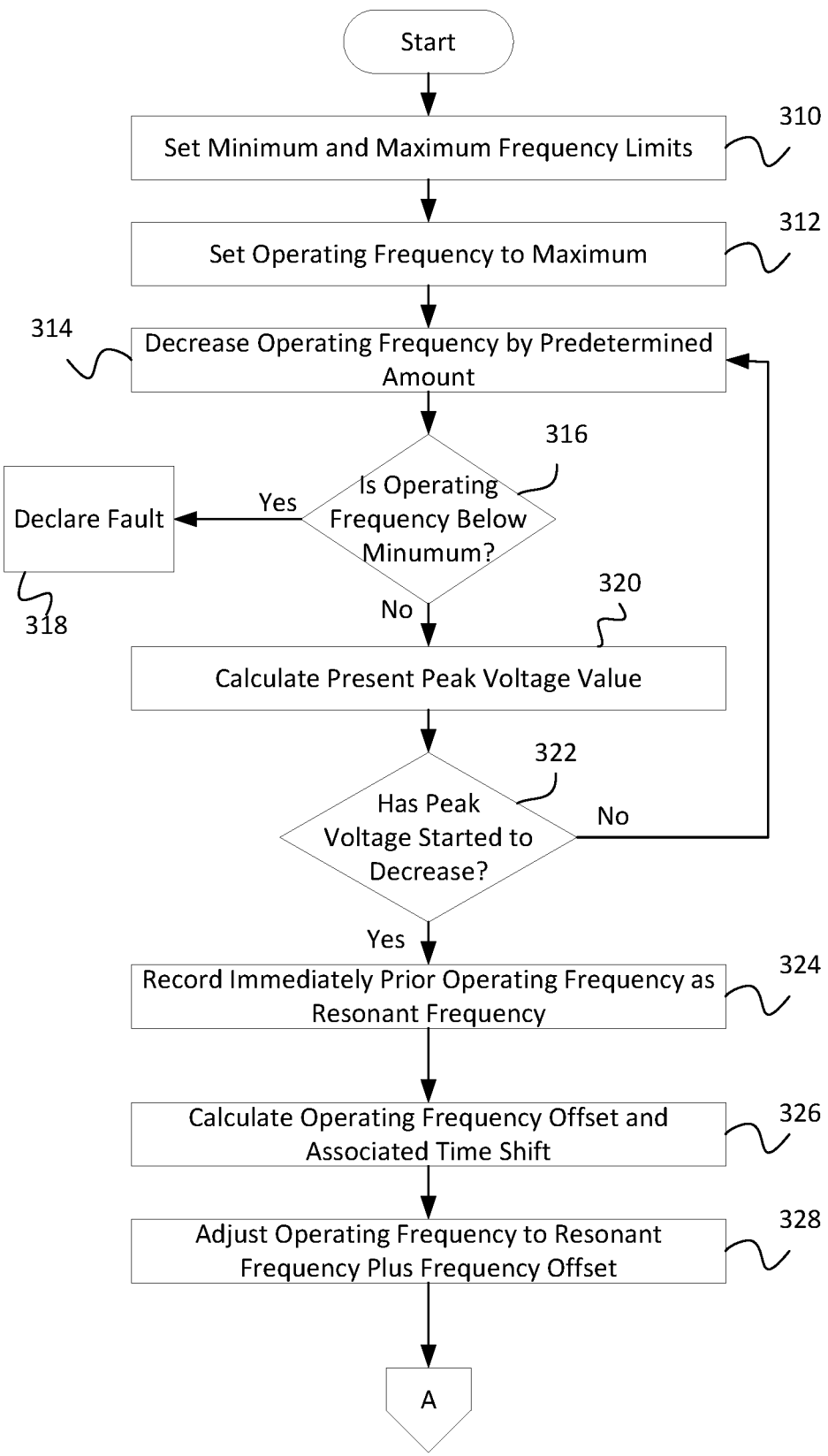
FIGS. 3A and 3B are a flowchart of method steps for determining an operating frequency for a wireless power transmitter, according to one embodiment of the invention.
Figure 3B:
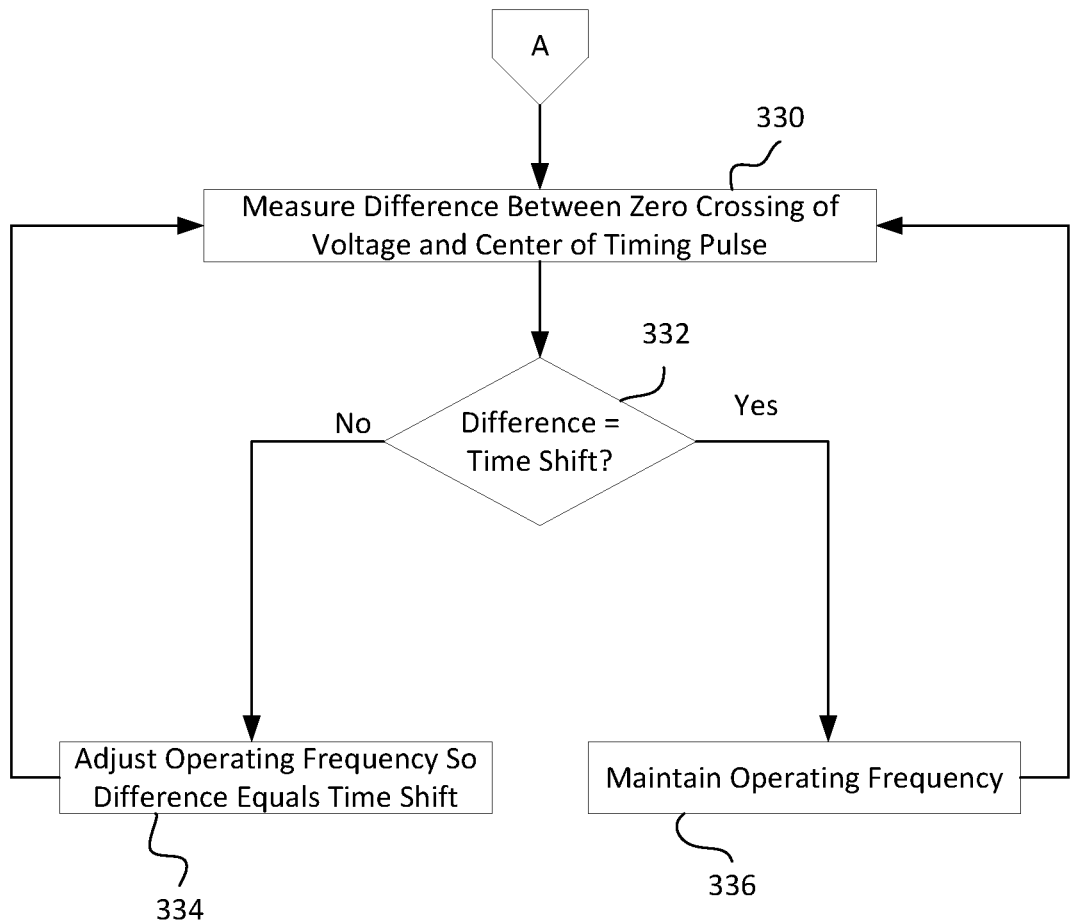

FIGS. 3A and 3B are a flowchart of method steps for determining an operating frequency for a wireless power transmitter, according to one embodiment of the invention. In a step 310, controller 130 sets a minimum frequency limit and a maximum frequency limit for potential operating frequencies of transmitter 100. In one embodiment, the minimum frequency limit is approximately 75 kHz and the maximum frequency limit is approximately 300 kHz. In a step 312, controller 130 sets the operating frequency of transmitter 100 to the maximum frequency limit. In a step 314, controller 130 decreases the operating frequency by a predetermined amount. In one embodiment, the predetermined amount is approximately 0.1 kHz. In a step 316, controller 130 determines whether the present operating frequency is below (i.e., less than) the minimum frequency limit. If the present operating frequency is below the minimum frequency limit, then in a step 318 controller 130 declares a fault and ceases providing power to LC tank 140. If the present operating frequency is not below the minimum frequency limit, then in a step 320 controller 130 calculates the present peak voltage value based on the peak voltage value signal from voltage detector 128. In one embodiment, controller 130 takes at least two samples of the peak voltage value signal and averages the samples to calculate the present peak voltage value. It should be noted that the peak voltage value signal from voltage detector 128 is a rectified and scaled-down representation of the voltage waveform at node 146. Averaging at least two samples assists in rejecting spurious noise in the peak voltage value signal. In other embodiments, controller 130 calculates the present peak voltage value using other techniques to avoid noise, for example by calculating a moving average of a plurality of samples of the peak voltage value signal or applying a standard deviation principle to ignore any samples of the peak voltage value signal outside a predetermined window of values.

In a step 322, controller 130 determines whether the peak voltage value has started to decrease. In one embodiment, controller 130 compares the present peak voltage value with at least one previously-calculated peak voltage value to determine whether the present peak voltage value is less than the previously-calculated peak voltage value. If the peak voltage value has not started to decrease, then the method returns to step 314 where controller 130 decreases the operating frequency by the predetermined amount. If the peak voltage value has started to decrease, then the method continues to step 324 in which controller 130 records the immediately prior operating frequency as the resonant frequency of transmitter 100. In one embodiment, controller 130 performs steps 312-324 a number of times, for example three times, records that number of values for the detected resonant frequency, and defines a detected resonant frequency only if a majority of the frequency values, for example two out of three values, are substantially equal, for example within 1% of each other.

In a step 326, controller 130 calculates an operating frequency offset and associated voltage time shift. In one embodiment, the operating frequency offset is 1-15% of the detected resonant frequency of transmitter 100; in a preferred embodiment the operating frequency offset is 5% of the detected resonant frequency of transmitter 100. The associated time shift is the time period associated with the operating frequency offset. For example, if the detected resonant frequency is 100 kHz, which has an associated time period of 10 microseconds, in one embodiment the operating frequency offset is 5% of 100 kHz, or 5 kHz. The associated time shift for an operating frequency offset of 5% of a detected resonant frequency of 100 kHz is 5% of 10 microseconds, which is 0.5 microseconds. In a step 328, controller 130 adjusts the operating frequency of transmitter 100 to a frequency equal to the resonant frequency plus the frequency offset. To continue the above example, the operating frequency is adjusted to 105 kHz.

Referring now to FIG. 3B, the method continues in a step 330, in which controller 130 measures the difference between the time of the zero crossing of the voltage magnitude signal provided by voltage detector 128 and the center of the timing pulse of a control signal applied to full-bridge circuit 122, for instance the control signal applied to transistor 118. In step 332, controller 130 determines whether the time difference is approximately equal (within a tolerance window) to the associated time shift calculated in step 326. To continue the above example, in an embodiment with a frequency resolution of 0.1 kHz at 100 kHz, the associated time resolution is 0.1/100 of 10 microseconds, or 10 nanoseconds. In this embodiment controller 130 maintains a time shift of 500 nanoseconds (0.5 microseconds) with an accuracy of about 10 to 20 nanoseconds. In one embodiment, controller 130 is configured to apply a window of plus or minus 50 nanoseconds around the associated time shift of 500 nanoseconds such that if the time difference is greater than 550 nanoseconds controller 130 will decrease the operating frequency and if the time difference is less than 450 nanoseconds controller 130 will increase the operating frequency. If the difference between the time of the zero crossing of the voltage magnitude signal and the center of the timing pulse is approximately equal to the time shift, then the method continues in step 336 where controller 130 maintains the operating frequency at its present value. The method then returns to step 330. If the difference between the time of the zero crossing of the voltage magnitude signal and the center of the timing pulse is not approximately equal to the time shift, then the method continues in step 334 where controller 130 adjusts the operating frequency such that the difference will be approximately equal to the time shift. The method then returns to step 330. Controller 130 continues to perform the steps of FIG. 3B to maintain the operating frequency at the predetermined percentage greater than the resonant frequency of transmitter 100 in the event that the resonant frequency changes, for example due to changes in the load on transmitter 100 by a wireless power receiver.

Figure 4A:
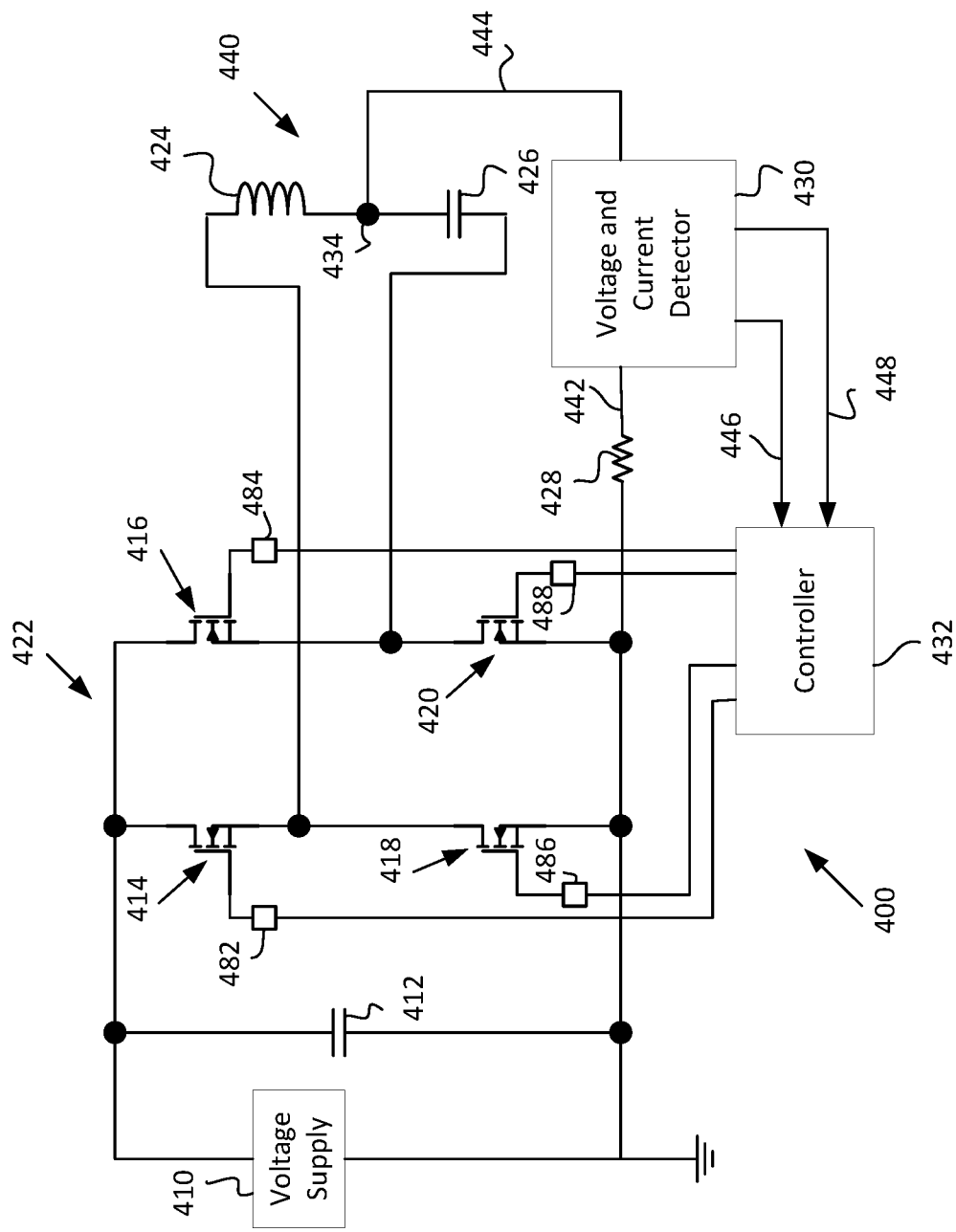
FIG. 4A is a diagram of one embodiment of a wireless power transmitter including a voltage and current detector, according to the invention.

FIG. 4A is a diagram of one embodiment of a wireless power transmitter 400 including a voltage and current detector, according to the invention. Transmitter 400 includes, but is not limited to, a direct current (DC) voltage supply 410, a capacitor 412, a full-bridge circuit 422 including a transistor 414, a transistor 416, a transistor 418, and a transistor 420, a transmitter coil 424, a capacitor 426, a resistor 428, a voltage and current detector 430, and a controller 432. Voltage supply 410 provides a DC input voltage for transmitter 400, and in one embodiment the input voltage is a constant value of approximately 12-15 V. In another embodiment, voltage supply 410 is implemented as a DC-to-DC converter that provides a variable DC input voltage to full-bridge 422 and controller 432 provides a control signal to voltage supply 410 to select the input voltage value. In other embodiments, the input voltage to transmitter coil 424 and capacitor 426 may be varied by duty cycle control or phase modulation of full-bridge circuit 422 by controller 432. In other embodiments, a combination of a variable input voltage from voltage supply 410, duty cycle variation, and/or phase modulation may be used to vary the voltage input to transmitter coil 424 and capacitor 426.

Controller 432 provides control signals to full-bridge circuit 422 via driver circuits 482, 484, 486, and 488 to drive each of transistors 414, 416, 418, and 420 on or off. In the FIG. 4A embodiment, each of transistors 414, 416, 418, and 420 is an n-type MOSFET; however any other type of transistor is within the scope of the invention. Controller 432 controls the timing of switching transistors 414, 416, 418, and 420 on and off to provide an alternating current to transmitter coil 424 and capacitor 426. In one embodiment, controller 432 will turn on (e.g., apply a "high" signal to the gates of) transistor 414 and transistor 420 while turning off (e.g., applying a "low" signal to the gates of) transistor 416 and transistor 418 during a time interval. During a next time interval, controller 432 will turn on transistor 416 and transistor 418 and turn off transistor 414 and transistor 420. Controller 432 may also provide for "dead time" between the time intervals, during which potentially cross-conducting pairs of transistors in full-bridge circuit 422, for example transistors 414 and 418 and/or transistors 416 and 420, are simultaneously off. In one embodiment, the dead time has a duration in the range of 100 nanoseconds to 1 millisecond. The timing of switching these pairs of transistors in full-bridge circuit 422 on and off by controller 432 establishes an operating frequency for transmitter 400. In another embodiment, controller 432 provides control signals to full-bridge circuit 422 such that it operates as a half-bridge. In this embodiment, controller 432 maintains transistor 416 in an off state and transistor 420 in an on state, and alternately switches on transistor 414 and transistor 418. In this embodiment full-bridge circuit 422 provides approximately half of the input voltage from voltage supply 410 to transmitter coil 424 and capacitor 426.

Transmitter coil 424 and capacitor 426 together form an LC tank 440. In other embodiments, LC tank 440 includes a plurality of transmitter coils and a plurality of capacitors. Voltage and current detector 430 receives as an input a voltage measured between a path 444 coupled to a node 434 between transmitter coil 424 and capacitor 426 and ground. In embodiments with more than one transmitter coil and more than one capacitor, path 444 of voltage and current detector 430 is coupled to a node between one of the transmitter coils and one of the capacitors. Voltage and current detector 430 detects and rectifies the voltage at node 434 and provides a peak voltage value signal to controller 432 through a path 448. The peak voltage value signal tracks the peak amplitude values of the rectified voltage waveform measured at node 434. Voltage and current detector 430 tracks the peak values of the rectified voltage when transmitter 400 is not under load and also when transmitter 400 is under load from a wireless receiver (not shown). Voltage and current detector 430 also provides a current magnitude signal to controller 432 through a path 446. An embodiment of voltage and current detector 430 is discussed further below in conjunction with FIG. 4B.

In one embodiment, controller 432 is a microcontroller executing firmware configured to process the peak voltage value signal and the current magnitude signal from voltage and current detector 430 and to generate the control signals for full-bridge circuit 422. In other embodiments, controller 432 is a field programmable gate array, a state machine, or an ASIC configured to generate the control signals. Controller 432 is configured to vary the operating frequency of transmitter 400 over a range of frequencies and to process the peak voltage value signal from voltage and current detector 430 to detect the resonant frequency of transmitter 400. Controller 432 is further configured to calculate an optimized operating frequency for transmitter 400 based on the detected resonant frequency. The optimized operating frequency for transmitter 400 is approximately 1-15% greater than the actual detected resonant frequency of transmitter 400. In one embodiment, the optimized operating frequency is approximately 5% greater than the detected resonant frequency of transmitter 400. An operating frequency that is approximately 1% to 15% greater than the actual resonant frequency has the effect that LC tank 440 appears inductive to full-bridge circuit 422 such that residual current will tend to flow naturally to either of the input supply rails during the dead time, allowing for zero-voltage switching and higher efficiency. By operating transmitter 400 at a frequency that is 1-15% greater than the detected resonant frequency, transmitter 400 provides close to its maximum available power to a wireless power receiver while also enabling zero-voltage switching of full-bridge circuit 422.

After controller 432 determines the optimized operating frequency by first locating the actual resonant frequency based on the peak amplitude of the voltage waveform at node 434, controller 432 then monitors the shape of the current waveform on path 442 by processing the current magnitude signal from voltage and current detector 430 to identify any changes to the resonant frequency and adjusts the operating frequency as needed to maintain the operating frequency at a value that is approximately 1-15% greater than the present resonant frequency. In one embodiment, controller 432 monitors the time difference between the peak of the current magnitude signal from voltage and current detector 430 and the center of a timing pulse of at least one of the control signals to full-bridge circuit 422, and adjusts the timing of the control signals (and thus also the operating frequency) if necessary to maintain the desired time difference.

In another embodiment, controller 432 is configured to establish the optimized operating frequency as a minimum operating frequency and may adjust the operating frequency, for example in response to requests from a wireless power receiver, without going below the minimum operating frequency. By not allowing the operating frequency to go below the optimized operating frequency, controller 432 ensures that LC tank 440 behaves in an overall inductive manner.

In one embodiment, controller 432 is further configured to detect foreign objects on a transmitting surface (not shown) of transmitter 400. When a metallic foreign object such as a coin or a key is present on the transmitting surface, eddy current losses in the foreign object will reduce the magnitude of the voltage detected by voltage and current detector 430. In this embodiment, controller 432 detects the presence of metallic foreign objects by comparing the peak voltage value signal at a frequency close to (for example, approximately 0.1 kHz greater than) the detected resonant frequency to a predetermined threshold. If the peak voltage value is less than the predetermined threshold, controller 432 reports a fault and turns off all of the transistors in full-bridge circuit 422 to cease providing power to transmitter coil 424. In one embodiment, controller 432 is configured to send a control signal to voltage supply 410 to generate an input voltage that is less than the under voltage lockout (UVLO) threshold of a wireless power receiver. Controller 432 then compares the peak voltage value signal to a predetermined threshold that is less than or substantially equal to an expected peak voltage value associated with the input voltage. By applying an input voltage from voltage supply 410 that is less than the UVLO threshold of a wireless power receiver, controller 432 is able to detect the presence of a foreign object on the transmitting surface before a wireless power receiver on the transmitting surface will detect a power signal from transmitter 400.

Figure 4B:
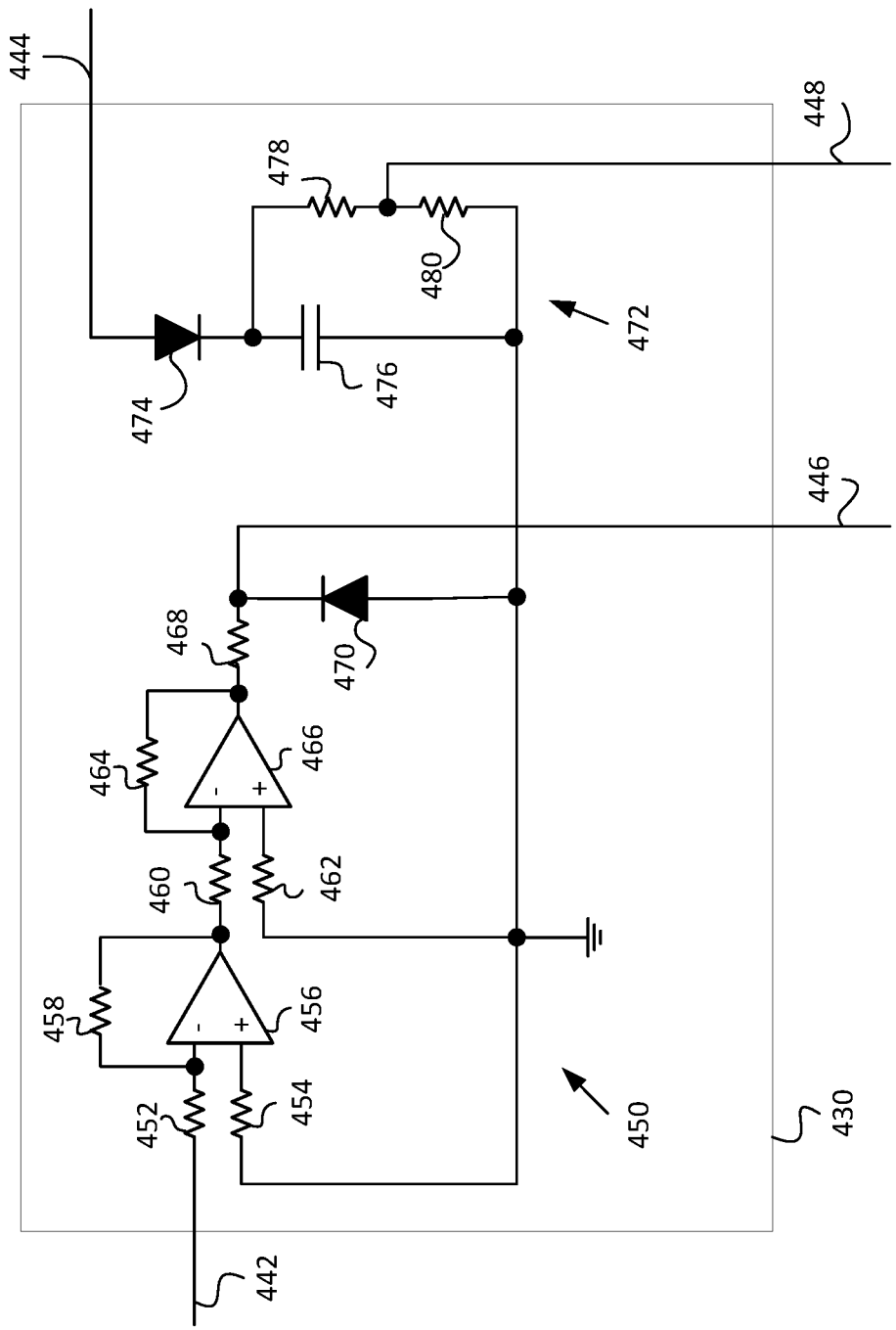
FIG. 4B is a diagram of one embodiment of the voltage and current detector of FIG. 4A, according to the invention.

FIG. 4B is a diagram of one embodiment of voltage and current detector 430 of FIG. 4A, according to the invention. Voltage and current detector 430 includes but is not limited to a current detector circuit 450 and a peak voltage detector circuit 472. Current detector circuit 450 amplifies and rectifies the current through resistor 428 and provides the current magnitude signal to control circuit 432 through path 446. Current detector circuit 450 includes a resistor 452, a resistor 454, a resistor 458, an operational amplifier 456, a resistor 460, a resistor 462, a resistor 464, an operational amplifier 466, a resistor 468, and a diode 470. In one embodiment, each of resistors 452, 454, 460, and 462 has a resistance value of approximately 10 kΩ, each of resistors 458 and 464 has a resistance value of approximately 470 kΩ, and resistor 468 has a resistance value of approximately 1 kΩ. Path 446 is coupled to a location between resistor 468 and diode 470 to provide the current magnitude signal to control circuit 432.

Peak voltage detector circuit 472 includes a diode 474 coupled in series with a capacitor 476, and a resistor 478 and a resistor 480. In one embodiment, capacitor 476 has a capacitance value of approximately 1 nF, resistor 478 has a resistance value of approximately 200 kΩ, and resistor 480 has a resistance value of approximately 10 kΩ. Path 448 is coupled to a location between resistor 478 and resistor 480 to provide the peak voltage value signal to controller 432. The resistor divider of resistor 478 and resistor 480 scales down the detected voltage to levels appropriate to be input to controller 432.

Figure 5A:
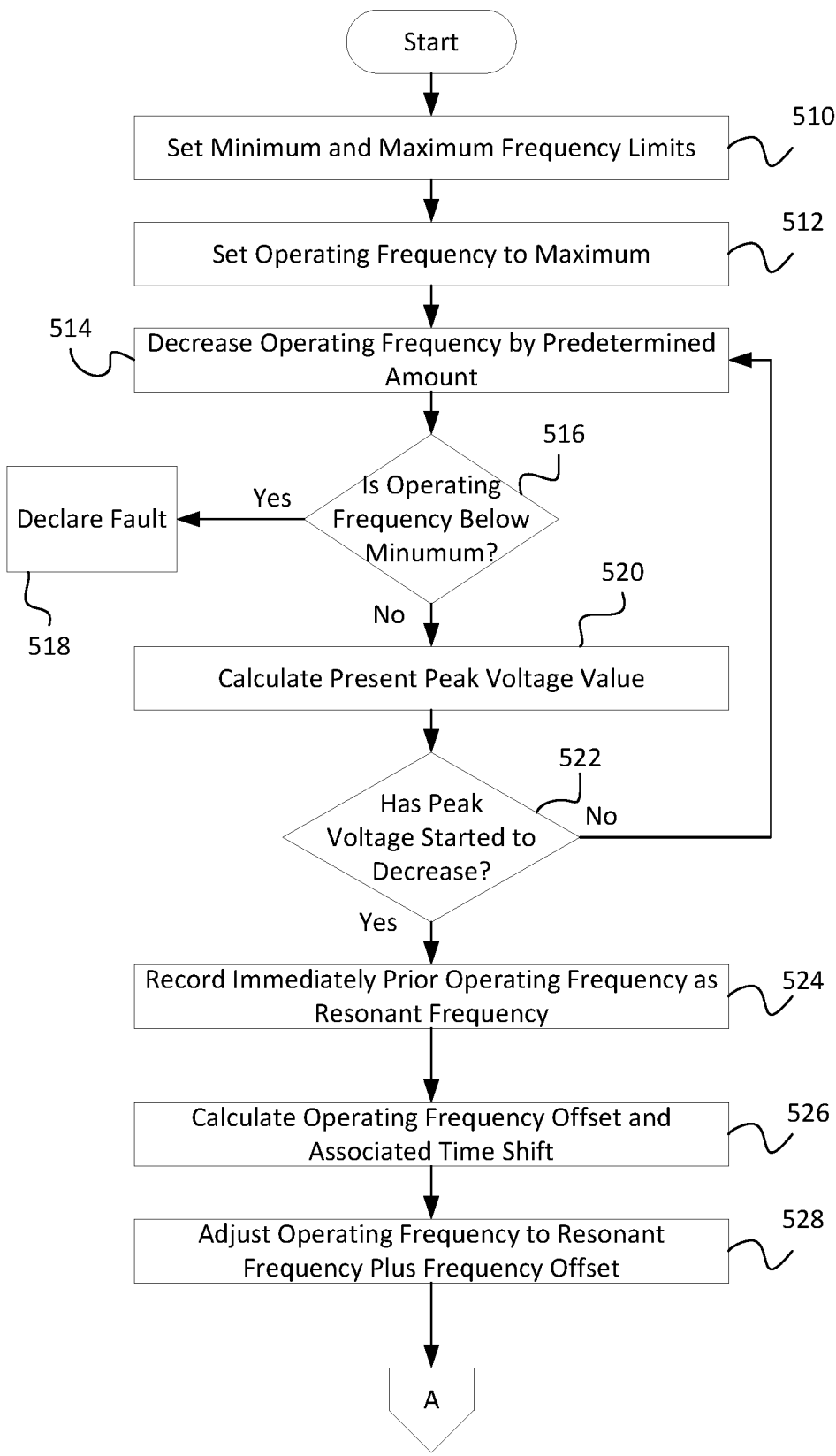
FIGS. 5A and 5B are a flowchart of method steps for determining an operating frequency for a wireless power transmitter, according to one embodiment of the invention.
Figure 5B:
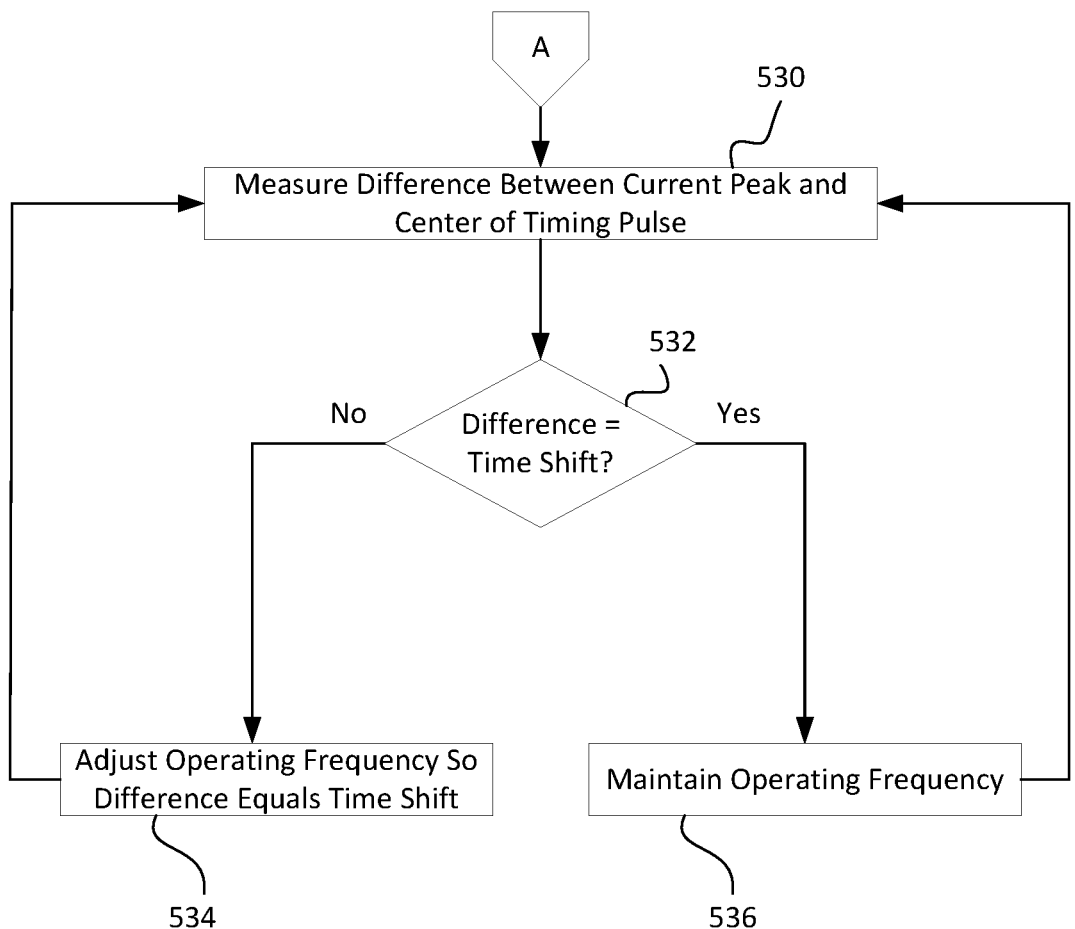

FIGS. 5A and 5B are a flowchart of method steps for determining an operating frequency for a wireless power transmitter, according to one embodiment of the invention. In a step 510, controller 432 sets a minimum frequency limit and a maximum frequency limit for potential operating frequencies of transmitter 400. In one embodiment, the minimum frequency limit is approximately 75 kHz and the maximum frequency limit is approximately 300 kHz. In a step 512, controller 432 sets the operating frequency of transmitter 400 to the maximum frequency limit. In a step 514, controller 432 decreases the operating frequency by a predetermined amount. In one embodiment, the predetermined amount is approximately 0.1 kHz. In a step 516, controller 432 determines whether the present operating frequency is below (i.e., less than) the minimum frequency limit. If the present operating frequency is below the minimum frequency limit, then in a step 518 controller 432 declares a fault and ceases providing power to LC tank 440. If the present operating frequency is not below the minimum frequency limit, then in a step 520 controller 432 calculates the present peak voltage value based on the peak voltage value signal from voltage and current detector 430. In one embodiment, controller 432 takes at least two samples of the peak voltage value signal and averages the samples to calculate the present peak voltage value. It should be noted that the peak voltage value signal from voltage and current detector 430 is a rectified and scaled-down representation of the voltage waveform at node 434. Averaging at least two samples assists in rejecting spurious noise in the peak voltage value signal. In other embodiments, controller 432 calculates the present peak voltage value using other techniques to avoid noise, for example by calculating a moving average of a plurality of samples of the peak voltage value signal or applying a standard deviation principle to ignore any samples of the peak voltage value signal outside a predetermined window of values.

In a step 522, controller 432 determines whether the peak voltage value has started to decrease. In one embodiment, controller 432 compares the present peak voltage value with at least one previously-calculated peak voltage value to determine whether the present peak voltage value is less than the previously-calculated peak voltage value. If the peak voltage value has not started to decrease, then the method returns to step 514 where control circuit 432 decreases the operating frequency by the predetermined amount. If the peak voltage value has started to decrease, then the method continues to step 524 in which controller 432 records the immediately prior operating frequency as the resonant frequency of transmitter 400. In one embodiment, controller 432 performs steps 512-524 a number of times, for example three times, records that number of values for the detected resonant frequency, and defines a detected resonant frequency only if a majority of the frequency values, for example two out of three values, are substantially equal, for example within 1% of each other.

In a step 526, controller 432 calculates an operating frequency offset and associated voltage time shift. In one embodiment, the operating frequency offset is 1-15% of the detected resonant frequency of transmitter 400; in a preferred embodiment the operating frequency offset is 5% of the detected resonant frequency of transmitter 400. The associated time shift is the time period associated with the operating frequency offset. For example, if the detected resonant frequency is 100 kHz, which has an associated time period of 10 microseconds, in one embodiment the operating frequency offset is 5% of 100 kHz, or 5 kHz. The associated time shift for an operating frequency offset of 5 kHz (5% of the detected resonant frequency of 100 kHz) is 5% of 10 microseconds, which is 0.5 microseconds. In a step 528, controller 432 adjusts the operating frequency of transmitter 400 to a frequency equal to the resonant frequency plus the frequency offset. To continue the above example, the operating frequency is adjusted to 105 kHz.

Referring now to FIG. 5B, the method continues in a step 530, in which controller 432 measures the difference between the time of the peak of the current magnitude signal provided by voltage and current detector 430 and the center of the timing pulse of a control signal applied to full-bridge circuit 422, for instance the control signal applied to transistor 418. In another embodiment, controller 432 measures the difference between the time of the zero crossing of the current magnitude signal provided by voltage and current detector 430 and the rising edge of the timing pulse of a control signal applied to full-bridge circuit 422. In step 532, controller 432 determines whether the time difference is approximately equal (within a tolerance window) to the associated time shift calculated in step 526. To continue the above example, in an embodiment with a frequency resolution of 0.1 kHz at 100 kHz, the associated time resolution is 0.1/100 of 10 microseconds, or 10 nanoseconds. In this embodiment controller 432 maintains a time shift of 500 nanoseconds (0.5 microseconds) with an accuracy of about 10 to 20 nanoseconds. In one embodiment, controller 432 is configured to apply a window of plus or minus 50 nanoseconds around the associated time shift of 500 nanoseconds such that if the time difference is greater than 550 nanoseconds controller 432 will decrease the operating frequency and if the time difference is less than 450 nanoseconds controller 432 will increase the operating frequency. If the difference between the time of the peak of the current magnitude signal and the center of the timing pulse is approximately equal to the time shift, then the method continues in step 536 where controller 432 maintains the operating frequency at its present value. The method then returns to step 530. If the difference between the time of the peak of the current magnitude signal and the center of the timing pulse is not approximately equal to the time shift, then the method continues in step 534 where controller 432 adjusts the operating frequency such that the difference will be approximately equal to the time shift. The method then returns to step 530. Controller 432 continues to perform the steps of FIG. 5B to maintain the operating frequency at the predetermined percentage greater than the resonant frequency of transmitter 400 in the event that the resonant frequency changes, for example due to changes in the load on transmitter 400 by a wireless power receiver.

Figure 6:
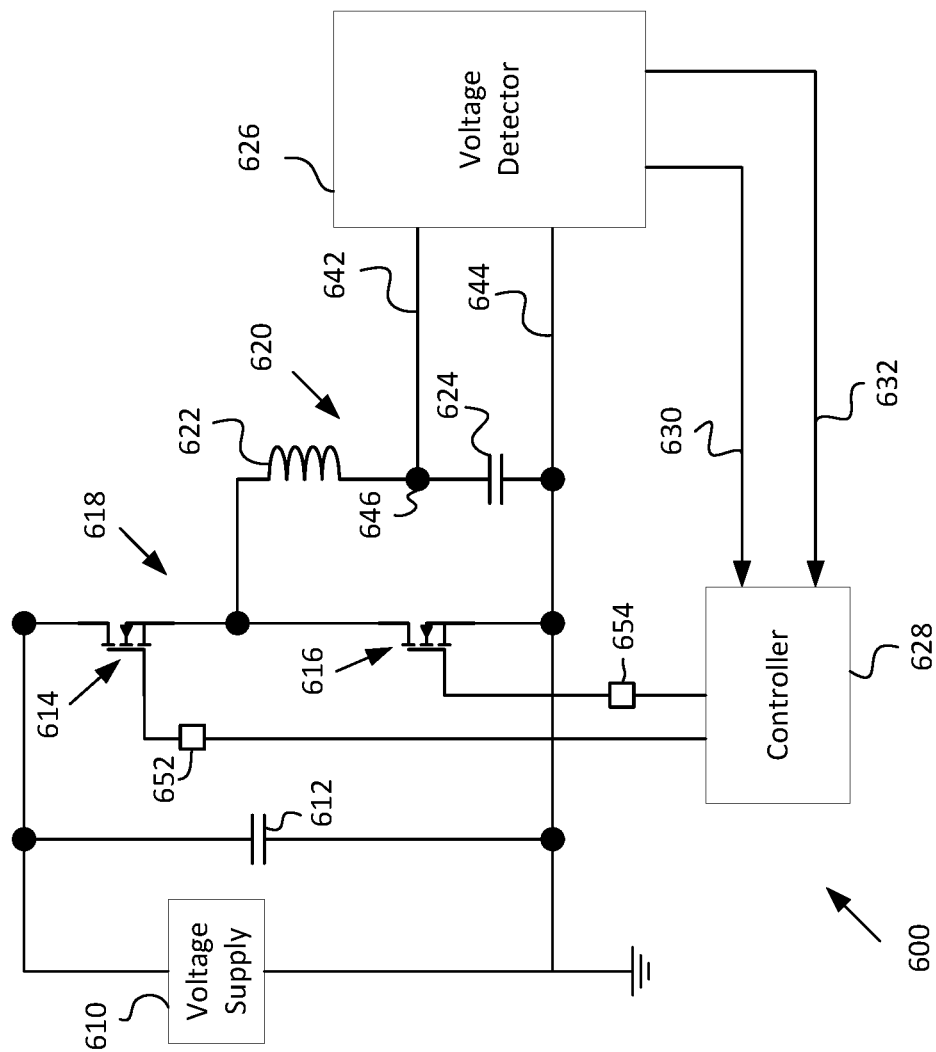
FIG. 6 is a diagram of one embodiment of a wireless power transmitter including a voltage detector, according to the invention.

FIG. 6 is a diagram of one embodiment of a wireless power transmitter 600 including a voltage detector, according to the invention. Transmitter 600 includes, but is not limited to, a direct current (DC) voltage supply 610, a capacitor 612, a half-bridge circuit 618 including a transistor 614 and a transistor 616, a transmitter coil 622, a capacitor 624, a voltage detector 626, and a controller 628. Voltage supply 610 provides a DC input voltage for transmitter 600, and in one embodiment the input voltage is a constant value of approximately 12-15 V. In another embodiment, voltage supply 610 is implemented as a DC-to-DC converter that provides a variable DC input voltage to half-bridge circuit 618 and controller 628 provides a control signal to voltage supply 610 to select the input voltage value. In other embodiments, the input voltage to transmitter coil 622 and capacitor 624 may be varied by duty cycle control or phase modulation of half-bridge circuit 618 by controller 628. In other embodiments, a combination of a variable input voltage from voltage supply 610, duty cycle variation, and/or phase modulation may be used to vary the voltage input to transmitter coil 622 and capacitor 624.

Controller 628 provides control signals to half-bridge circuit 618 via driver circuits 652 and 654 to drive each of transistors 614 and 616 on or off. In the FIG. 6 embodiment, each of transistors 614 and 616 is an n-type MOSFET; however any other type of transistor is within the scope of the invention. Controller 628 controls the timing of switching transistors 614 and 616 on and off to provide an alternating current to transmitter coil 622 and capacitor 624. In one embodiment, controller 628 will turn on (e.g., apply a "high" signal to the gate of) transistor 614 while turning off (e.g., applying a "low" signal to the gate of) transistor 616 during a time interval. During a next time interval, controller 628 will turn on transistor 616 and turn off transistor 614. Controller 628 may also provide for "dead time" between these time intervals during which both of transistors 614 and 616 are simultaneously off. In one embodiment, the dead time has a duration in the range of 100 nanoseconds to 1 millisecond. The timing of switching the pair of transistors in half-bridge circuit 618 on and off by controller 628 establishes an operating frequency for transmitter 600.

Transmitter coil 622 and capacitor 624 together form an LC tank 620. In other embodiments, LC tank 620 includes a plurality of transmitter coils and a plurality of capacitors. Voltage detector 626 receives as an input a voltage measured between a path 642 coupled to a node 646 between transmitter coil 622 and capacitor 624 and a path 644 to ground. In embodiments with more than one transmitter coil and more than one capacitor, the input to voltage detector 626 is coupled to a node between one of the transmitter coils and one of the capacitors. Voltage detector 626 detects and rectifies the voltage at node 646 and provides a peak voltage value signal to controller 628 through a path 630. The peak voltage value signal tracks the peak amplitude values of the rectified voltage waveform measured at node 646. Voltage detector 626 tracks the peak values of the rectified voltage when transmitter 600 is not under load and also when transmitter 600 is under load from a wireless receiver (not shown). Voltage detector 626 also provides a rectified voltage signal to controller 628 through a path 632. In one embodiment, voltage detector 626 is implemented as voltage detector 128 as discussed above in conjunction with FIG. 1B.

In one embodiment, controller 628 is a microcontroller executing firmware configured to process the peak voltage value signal and the rectified voltage signal from voltage detector 626 and to generate the control signals for half-bridge circuit 618. In other embodiments, controller 628 is a field programmable gate array, a state machine, or an ASIC configured to generate the control signals. Controller 628 is configured to vary the operating frequency of transmitter 600 over a range of frequencies and to process the peak voltage value signal from voltage detector 626 to detect the resonant frequency of transmitter 600. Controller 628 is further configured to calculate an optimized operating frequency for transmitter 600 based on the detected resonant frequency. The optimized operating frequency for transmitter 600 is approximately 1-15% greater than the actual detected resonant frequency of transmitter 600. In one embodiment, the optimized operating frequency is approximately 5% greater than the detected resonant frequency of transmitter 600. An operating frequency that is approximately 1% to 15% greater than the actual resonant frequency has the effect that LC tank 620 appears inductive to half-bridge circuit 618 such that residual current will tend to flow naturally to either of the input supply rails during the dead time, allowing for zero-voltage switching and higher efficiency. By operating transmitter 600 at a frequency that is 1-15% greater than the detected resonant frequency, transmitter 600 provides close to its maximum available power to a wireless power receiver while also enabling zero-voltage switching of half-bridge circuit 618.

After controller 628 determines the optimized operating frequency by first locating the actual resonant frequency based on the peak amplitude of the voltage waveform at node 646, controller 628 then monitors the shape of the voltage waveform at node 646 by processing the rectified voltage signal to identify any changes to the resonant frequency and to adjust the operating frequency as needed to maintain the operating frequency at a value that is approximately 1-15% greater than the present resonant frequency. In one embodiment, controller 628 implements the method steps discussed above in conjunction with FIGS. 3A and 3B.

In another embodiment, controller 628 is configured to establish the optimized operating frequency as a minimum operating frequency and may adjust the operating frequency, for example in response to requests from a wireless power receiver, without going below the minimum operating frequency. By not allowing the operating frequency to go below the optimized operating frequency, controller 628 ensures that LC tank 620 behaves in an overall inductive manner.

In one embodiment, controller 628 is further configured to detect foreign objects on a transmitting surface (not shown) of transmitter 600. When a metallic foreign object such as a coin or a key is present on the transmitting surface, eddy current losses in the foreign object will reduce the magnitude of the voltage detected by voltage detector 626. In this embodiment, controller 628 detects the presence of metallic foreign objects by comparing the peak voltage value signal at a frequency approximately equal to the detected resonant frequency to a predetermined threshold. If the peak voltage value is less than the predetermined threshold, controller 628 reports a fault and turns off all of the transistors in half-bridge circuit 618 to cease providing power to transmitter coil 622. In one embodiment, controller 628 is configured to send a control signal to voltage supply 610 to generate an input voltage that is less than the under voltage lockout (UVLO) threshold of a wireless power receiver. Controller 628 then compares the peak voltage value signal to a predetermined threshold that is less than or substantially equal to an expected peak voltage value associated with the input voltage. By applying an input voltage from voltage supply 610 that is less than the UVLO threshold of a wireless power receiver, controller 628 is able to detect the presence of a foreign object on the transmitting surface before a wireless power receiver on the transmitting surface will detect a power signal from transmitter 600.

Figure 7A:
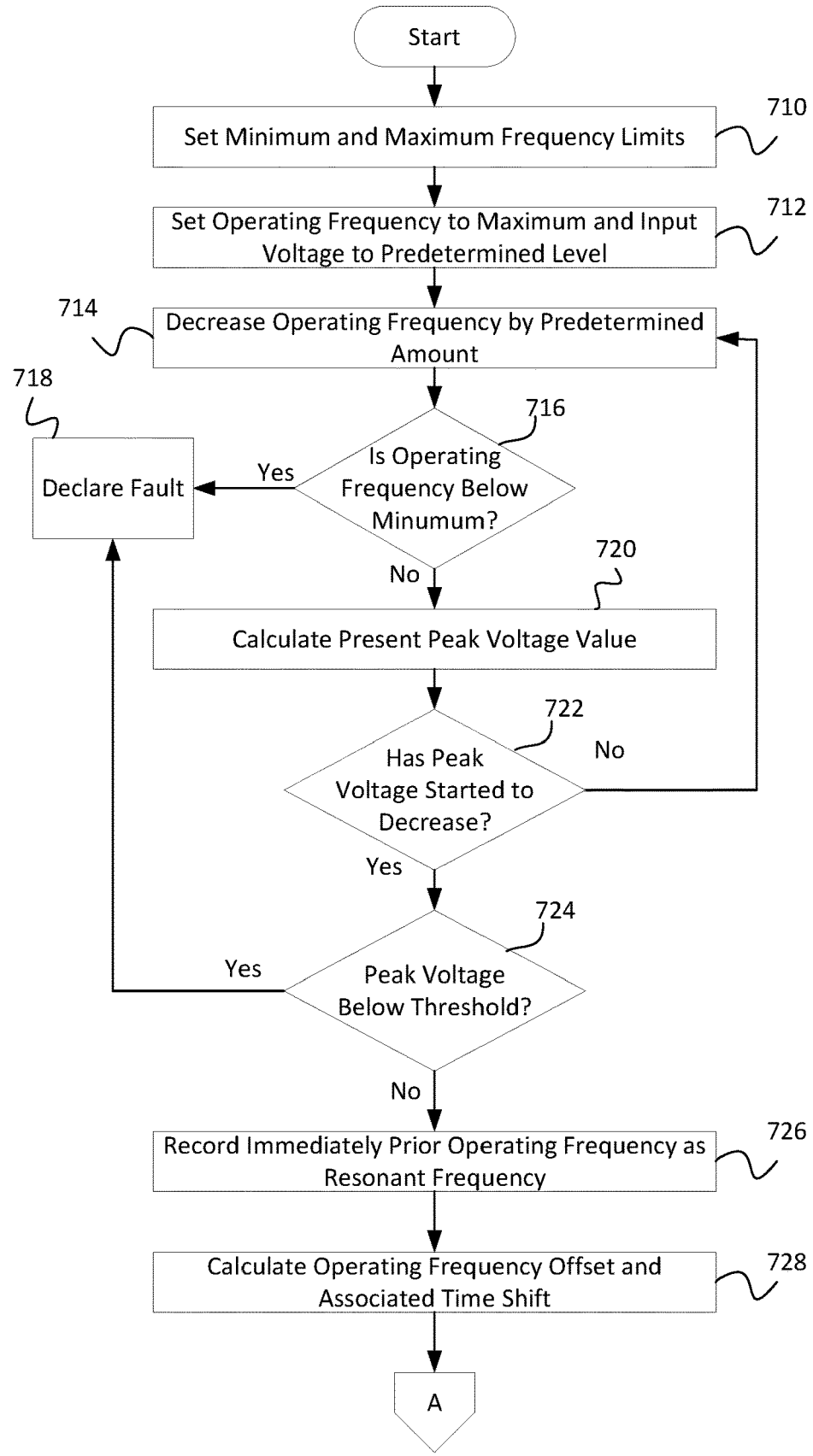
FIGS. 7A and 7B are a flowchart of method steps for determining an operating frequency for a wireless power transmitter and detecting foreign objects, according to one embodiment of the invention.
Figure 7B:
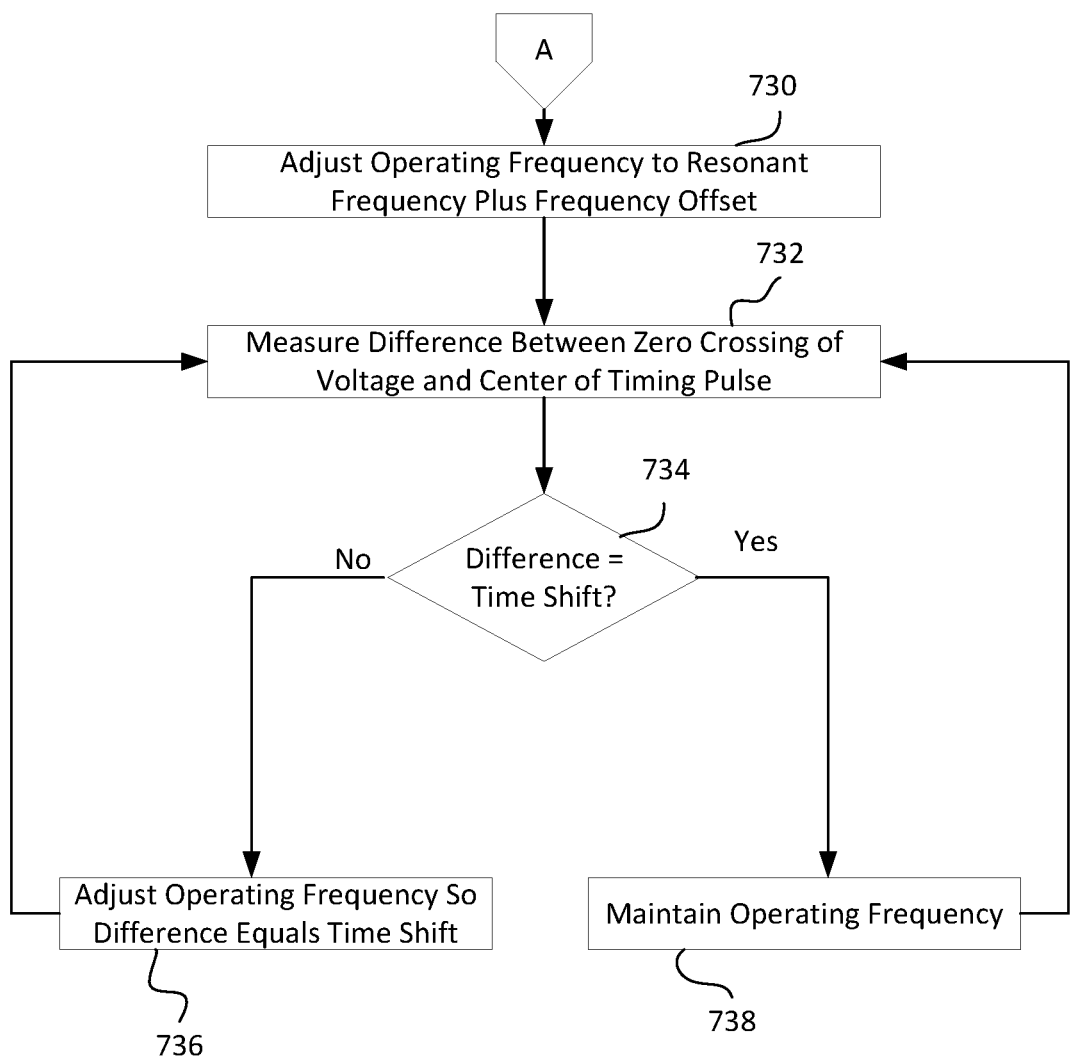

FIGS. 7A and 7B are a flowchart of method steps for determining an operating frequency for a wireless power transmitter and detecting foreign objects, according to one embodiment of the invention. The embodiment of FIGS. 7A and 7B is described as being implemented in a wireless power transmitter such as transmitter 100 of FIG. 1A with a voltage supply 110 configured to provide a variable voltage; however the method of FIGS. 7A and 7B may be implemented in other embodiments of wireless power transmitters such as the embodiment of FIG. 6. In a step 710, controller 130 sets a minimum frequency limit and a maximum frequency limit for potential operating frequencies of transmitter 100. In one embodiment, the minimum frequency limit is approximately 75 kHz and the maximum frequency limit is approximately 300 kHz. In a step 712, controller 130 sets the operating frequency of transmitter 100 to the maximum frequency limit and sets the input voltage to a predetermined level. In one embodiment, the predetermined voltage level is less than an under voltage lockout (UVLO) threshold of a wireless power receiver. In a step 714, controller 130 decreases the operating frequency by a predetermined amount. In one embodiment, the predetermined amount is approximately 0.1 kHz. In a step 716, controller 130 determines whether the present operating frequency is below (i.e., less than) the minimum frequency limit. If the present operating frequency is below the minimum frequency limit, then in a step 718 controller 130 declares a fault and ceases providing power to LC tank 140. If the present operating frequency is not below the minimum frequency limit, then in a step 720 controller 130 calculates the present peak voltage value based on the peak voltage value signal from voltage detector 128. It should be noted that the peak voltage value signal from voltage detector 128 is a rectified and scaled-down representation of the voltage waveform at node 146. In one embodiment, controller 130 takes at least two samples of the peak voltage value signal and averages the samples to calculate the present peak voltage value. Averaging at least two samples assists in rejecting spurious noise in the peak voltage value signal. In other embodiments, controller 130 calculates the present peak voltage value using other techniques to avoid noise, for example by calculating a moving average of a plurality of samples of the peak voltage value signal or applying a standard deviation principle to ignore any samples of the peak voltage value signal outside a predetermined window of values.

In a step 722, controller 130 determines whether the peak voltage value has started to decrease. In one embodiment, controller 130 compares the present peak voltage value with at least one previously-calculated peak voltage value to determine whether the present peak voltage value is less than the previously-calculated peak voltage value. If the peak voltage value has not started to decrease, then the method returns to step 714 where controller 130 decreases the operating frequency by the predetermined amount. If the peak voltage value has started to decrease, then the method continues to step 724.

In a step 724, controller 130 determines whether the present peak voltage value is below a predetermined threshold. If a metallic foreign object such as a coin is present on the transmitting surface of transmitter 100, eddy current losses in the metallic object will cause the peak voltage value to be less than if no foreign object was present. In one embodiment, the predetermined threshold is 0.8 V. If controller 130 determines that the present peak voltage value is below the predetermined threshold, then the method continues in step 718, where controller 130 declares a fault and ceases providing power to LC tank 140. If in step 724 the peak voltage value is not below the predetermined threshold, the method continues in a step 726, in which controller 130 records the immediately prior operating frequency as the resonant frequency of transmitter 100. In one embodiment, controller 130 performs steps 712-726 a number of times, for example three times, records that number of values for the detected resonant frequency, and defines a detected resonant frequency only if a majority of the frequency values, for example two out of three values, are substantially equal, for example within 1% of each other.

In a step 728, controller 130 calculates an operating frequency offset and associated voltage time shift. In one embodiment, the operating frequency offset is 1-15% of the detected resonant frequency of transmitter 100; in a preferred embodiment the operating frequency offset is 5% of the detected resonant frequency of transmitter 100. The associated time shift is the time period associated with the operating frequency offset. For example, if the detected resonant frequency is 100 kHz, in one embodiment the operating frequency offset is 5% of 100 kHz, or 5 kHz. The associated time shift for an operating frequency offset of 5% of a detected resonant frequency of 100 kHz is 5% of 10 microseconds, which is 0.5 microseconds.

Referring now to FIG. 7B, the method continues in a step 730, in which controller 130 adjusts the operating frequency of transmitter 100 to a frequency equal to the resonant frequency plus the frequency offset. To continue the above example, the operating frequency is adjusted to 105 kHz. If in step 712 the predetermined voltage was less than the UVLO voltage of a wireless receiver, then in step 730 controller 130 also adjusts the input voltage to full-bridge 122 to a value appropriate to provide power to the wireless receiver. In a step 732, controller 130 measures the difference between the time of the zero crossing of the voltage magnitude signal provided by voltage detector 128 and the center of the timing pulse of a control signal applied to full-bridge circuit 122, for instance the control signal applied to transistor 118. In step 734, controller 130 determines whether the time difference is approximately equal (within a tolerance window such as for example, plus or minus 50 nanoseconds) to the associated time shift calculated in step 728. If the difference between the time of the zero crossing of the voltage magnitude signal and the center of the timing pulse is approximately equal to the time shift, then the method continues in step 738 where controller 130 maintains the operating frequency at its present value. The method then returns to step 732. If the difference between the time of the zero crossing of the voltage magnitude signal and the center of the timing pulse is not approximately equal to the time shift, then the method continues in step 736 where controller 130 adjusts the operating frequency such that the difference will be approximately equal to the time shift. The method then returns to step 732. Controller 130 continues to perform steps 732, 734, and 736 or 738 to maintain the operating frequency at the predetermined percentage greater than the resonant frequency of transmitter 100 in the event that the resonant frequency changes, for example due to changes in the load on transmitter 100 by a wireless power receiver.

Figure 8:
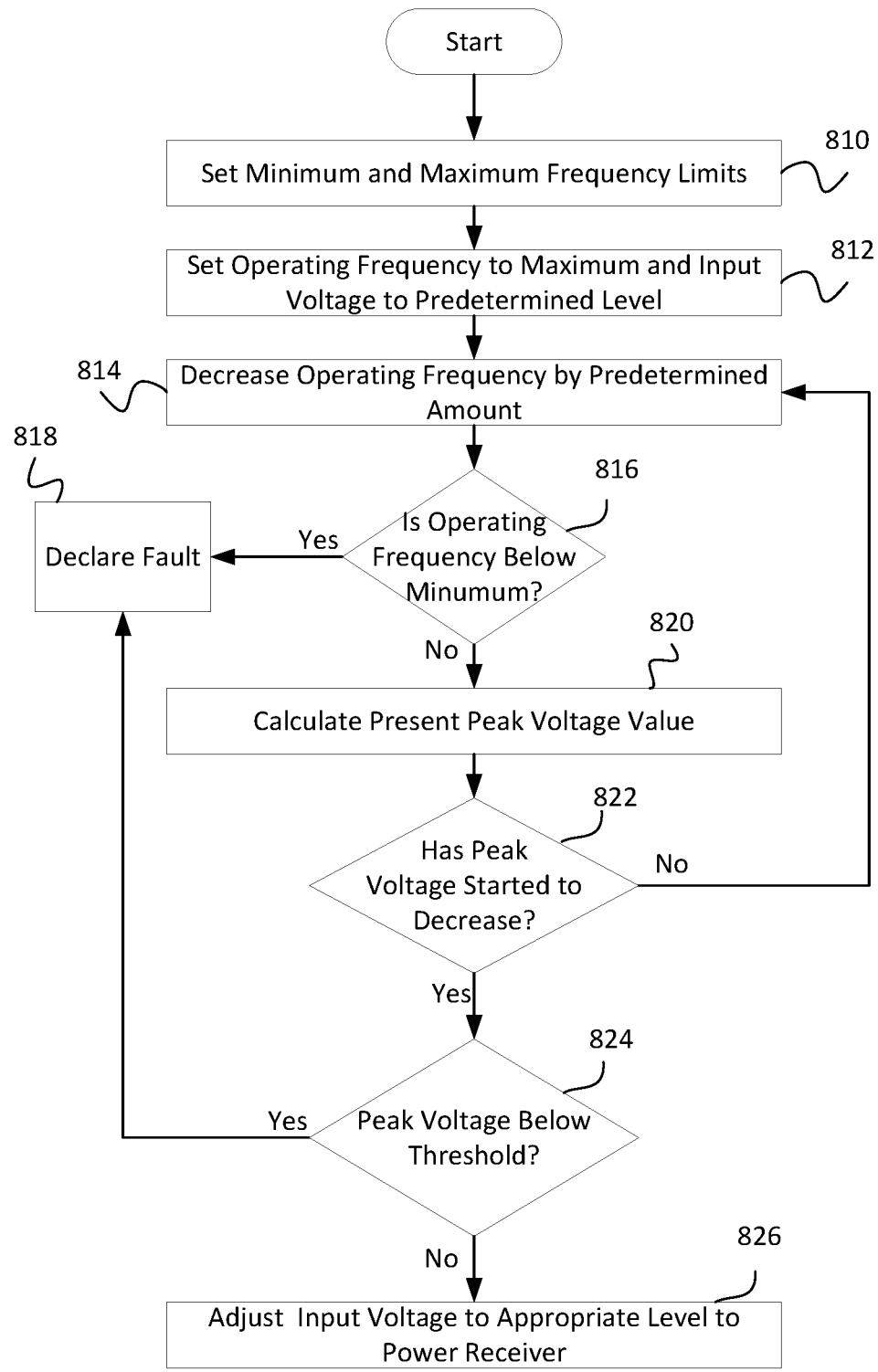
FIG. 8 is a flowchart of method steps for detecting foreign objects on a wireless power transmitter, according to one embodiment of the invention.

FIG. 8 is a flowchart of method steps for detecting foreign metal objects, according to one embodiment of the invention. The embodiment of FIG. 8 is described as being implemented in a wireless power transmitter such as transmitter 100 of FIG. 1A with a voltage supply 110 configured to provide a variable voltage; however the method of FIG. 8 may be implemented in other embodiments of wireless power transmitters such as the embodiments of FIG. 4A and FIG. 6.

In a step 810, controller 130 sets a minimum frequency limit and a maximum frequency limit for potential operating frequencies of transmitter 100. In one embodiment, the minimum frequency limit is approximately 75 kHz and the maximum frequency limit is approximately 300 kHz. In a step 812, controller 130 sets the operating frequency of transmitter 100 to the maximum frequency limit and sets the input voltage to a predetermined level. In one embodiment, the predetermined voltage level is less than an under voltage lockout (UVLO) threshold of a wireless power receiver. In a step 814, controller 130 decreases the operating frequency by a predetermined amount. In one embodiment, the predetermined amount is approximately 0.1 kHz. In a step 816, controller 130 determines whether the present operating frequency is below (i.e., less than) the minimum frequency limit. If the present operating frequency is below the minimum frequency limit, then in a step 818 controller 130 declares a fault and ceases providing power to LC tank 140. If the present operating frequency is not below the minimum frequency limit, then in a step 820 controller 130 calculates the present peak voltage value based on the peak voltage value signal from voltage detector 128.

In a step 822, controller 130 determines whether the peak voltage value has started to decrease. In one embodiment, controller 130 compares the present peak voltage value with at least one previously-calculated peak voltage value to determine whether the present peak voltage value is less than the previously-calculated peak voltage value. If the peak voltage value has not started to decrease, then the method returns to step 814 where controller 130 decreases the operating frequency by the predetermined amount. If the peak voltage value has started to decrease, then the method continues to step 824.

In a step 824, controller 130 determines whether the present peak voltage value is below a predetermined threshold. If a metallic foreign object such as a coin is present on the transmitting surface of transmitter 100, eddy current losses in the metallic object will cause the peak voltage value to be less than if no foreign object was present. In one embodiment, the predetermined threshold is 0.8 V. If controller 130 determines that the present peak voltage value is below the predetermined threshold, then the method continues in step 818, where controller 130 declares a fault and ceases providing power to LC tank 140. If the present peak voltage value is not below the predetermined threshold, then the method continues in step 826, in which controller 130 adjusts the input voltage to full-bridge circuit 122 to an appropriate level to power a wireless receiver.

In another embodiment, controller 130 performs the frequency sweep operations of steps 810 through 822, but instead of comparing the peak voltage value to a predetermined threshold in step 824, which occurs at a frequency close to (for example, approximately 0.1 kHz greater than) the detected resonant frequency, controller 130 compares the peak voltage value to a predetermined threshold at an earlier point in the sweep when the operating frequency is at a frequency much higher than the resonant frequency. If the peak voltage value is below the predetermined threshold at that predetermined frequency, then controller 130 will cause full-bridge circuit 122 to cease providing power to LC tank 140 because of the likely presence of a foreign metal object on the transmitting surface.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for frequency control in a wireless power transmitter, comprising:
   detecting a resonant frequency of the wireless power transmitter;
   determining an optimized frequency that is at least 1% greater than the detected resonant frequency;
   operating the wireless power transmitter at the optimized frequency;
   detecting an amount of change in the resonant frequency of the wireless power transmitter;
   adjusting the optimized operating frequency by the amount of change in the resonant frequency; and
   operating the wireless power transmitter at the adjusted optimized operating frequency.

2. The method of claim 1, wherein the optimized frequency is 1% to 15% greater than the detected resonant frequency.

3. The method of claim 1, wherein the optimized frequency is at least 5% greater than the detected resonant frequency.

4. The method of claim 1, wherein detecting an amount of change in the resonant frequency of the wireless power transmitter is based on a detected voltage signal.

5. The method of claim 1, wherein detecting an amount of change in the resonant frequency of the wireless power transmitter is based on a detected current signal.

6. The method of claim 1, wherein detecting a resonant frequency of the wireless power transmitter comprises:
   operating the wireless transmitter at each of a series of frequencies;

detecting a peak voltage magnitude value of a voltage at a node between a transmitter coil and a resonant capacitor at each of the series of frequencies;
identifying which one of the series of frequencies corresponds to a maximum peak voltage magnitude value; and
recording the one of the series of frequencies that corresponds to the maximum peak voltage magnitude value as the resonant frequency.

7. The method of claim 6, further comprising:
comparing the peak voltage magnitude value at least one of the series of frequencies to a predetermined threshold; and
if the peak voltage magnitude value at the at least one of the series of frequencies is below the predetermined threshold, ceasing providing power to the transmitter coil and resonant capacitor.

8. A system for frequency control of a wireless power transmitter, comprising:
a transmitter coil coupled in series with a capacitor;
a voltage detector configured to detect a voltage at a node between the transmitter coil and the capacitor, the voltage detector further configured to generate a peak voltage value signal; and
a controller configured to detect a resonant frequency of the wireless power transmitter based on the peak voltage value signal, the controller further configured to calculate an optimized operating frequency for the wireless power transmitter that is at least 1% greater than the resonant frequency and to operate the wireless power transmitter at the optimized operating frequency.

9. The system of claim 8, wherein the optimized operating frequency is 1% to 15% greater than the detected resonant frequency.

10. The system of claim 8, wherein the optimized operating frequency is at least 5% greater than the detected resonant frequency.

11. The system of claim 8, wherein the controller is further configured to detect an amount of change of the detected resonant frequency, adjust the optimized operating frequency by the amount of change in the resonant frequency, and operate the wireless power transmitter at the adjusted optimized operating frequency.

12. The system of claim 11, wherein the voltage detector is further configured to generate a voltage magnitude signal and the controller is configured to detect the amount of change of the detected resonant frequency based on the voltage magnitude signal.

13. The system of claim 11, further comprising a current detector configured to generate a current magnitude signal, and wherein the controller is configured to detect the amount of change of the detected resonant frequency based on the current magnitude signal.

14. The system of claim 8, wherein the controller is configured to detect the resonant frequency by
operating the wireless transmitter at each of a series of frequencies;
identifying which one of the series of frequencies corresponds to a maximum peak voltage magnitude value of the peak voltage value signal; and
recording the one of the series of frequencies that corresponds to the maximum peak voltage magnitude value as the resonant frequency.

15. The system of claim 14, wherein the controller is further configured to detect foreign metallic objects on a transmitting surface of the wireless power transmitter by comparing the peak voltage magnitude value at least one of the series of frequencies to a predetermined threshold; and
if the peak voltage magnitude value at the at least one of the series of frequencies is below the predetermined threshold, ceasing providing power to the transmitter coil and resonant capacitor.

16. A method for frequency control of a wireless power transmitter comprising: operating the wireless power transmitter at a plurality of frequencies;
identifying one of the plurality of frequencies as a resonant frequency of the wireless power transmitter;
determining an optimized operating frequency for the wireless power transmitter by calculating a frequency value that is 1% to 15% greater than the resonant frequency; and
operating the wireless power transmitter at the optimized operating frequency,
wherein identifying one of the plurality of frequencies as the resonant frequency comprises identifying which one of the plurality of frequencies produces a maximum of a peak voltage signal at a node between a transmitter coil and a resonant capacitor of the wireless power transmitter.

17. The method of claim 16, further comprising:
monitoring a voltage magnitude signal to identify if the resonant frequency has changed; and
if the resonant frequency has changed, adjusting the optimized operating frequency by an amount approximately equal to an amount of change of the resonant frequency.

18. The method of claim 16, further comprising:
monitoring a current magnitude signal to identify if the resonant frequency has changed; and
if the resonant frequency has changed, adjusting the optimized operating frequency by an amount approximately equal to an amount of change of the resonant frequency.

* * * * *